(12) United States Patent  (10) Patent No.: US 6,729,431 B2
Osuga et al.  (45) Date of Patent: May 4, 2004

(54) TRACTOR WITH IMPLEMENT MOUNTING FRAME

(75) Inventors: Masashi Osuga, Nara-ken (JP); Hiroshi Shimada, Nara-ken (JP); Takashi Shibata, Sakai (JP); Hiroshi Oshima, Osaka (JP); Eriya Harada, Sakai (JP); Hiroshi Kawabata, Sakai (JP); Yoshio Tomiyama, Osaka (JP)

(73) Assignee: Kubota Corporation, Osaka (JP)

( * ) Notice: Subject to any disclaimer, the term of this patent is extended or adjusted under 35 U.S.C. 154(b) by 21 days.

(21) Appl. No.: 10/083,672

(22) Filed: Feb. 26, 2002

(65) Prior Publication Data

US 2003/0010563 A1 Jan. 16, 2003

(30) Foreign Application Priority Data

Jul. 10, 2001 (JP) .................................... 2001-209944
Jul. 10, 2001 (JP) .................................... 2001-209945
Jul. 10, 2001 (JP) .................................... 2001-209946
Jul. 10, 2001 (JP) .................................... 2001-209947

(51) Int. Cl.$^7$ ......................... E02F 3/627; A01D 34/64
(52) U.S. Cl. ................... 180/312; 414/686; 37/403; 56/14.9; 280/756
(58) Field of Search ............................. 180/311, 312; 414/686; 37/403, 468; 172/272, 274, 275; 280/756; 56/14.7, 14.9

(56) References Cited

U.S. PATENT DOCUMENTS 4,168,087 A * 9/1979 Paplaski et al. ............ 280/800
4,182,456 A * 1/1980 Paul ........................... 414/685
5,000,269 A * 3/1991 Aoki et al. .................. 414/686
6,056,502 A   5/2000 Takemura et al.
6,276,119 B1  8/2001 Oshima et al.
6,318,485 B1  11/2001 Osuga et al.
6,446,367 B1 * 9/2002 Muramoto et al. ......... 414/686

FOREIGN PATENT DOCUMENTS

JP        11332346      12/1999
JP        11334394      12/1999
JP       2000273901      3/2000

* cited by examiner

*Primary Examiner*—Peter C. English
(74) *Attorney, Agent, or Firm*—Webb Ziesenheim Logsdon Orkin & Hanson, P.C.

(57) ABSTRACT

A frame type tractor having an engine mounted in a front region of a main frame extending longitudinally of a tractor body, and a transmission case mounted in a rear region of the main frame. A backhoe mounting frame is attached to a rear end of the main frame. Rollover protection system mounts are arranged in upper portions of the backhoe mounting frame for fixedly supporting a rollover protection system. The backhoe mounting frame has a frame structure defining an inside space therein and including a pair of right and left side walls, a top wall interconnecting upper ends of the side walls, and a bottom wall interconnecting lower ends of the side walls. The right and left side walls have the rollover protection system mounts and backhoe attaching portions for engaging and connecting a backhoe unit.

23 Claims, 21 Drawing Sheets

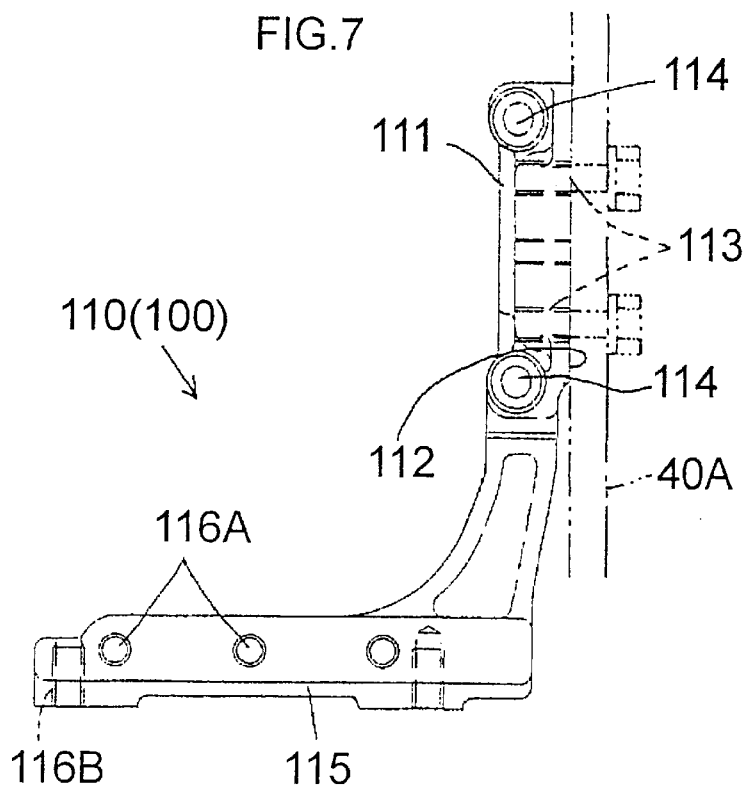
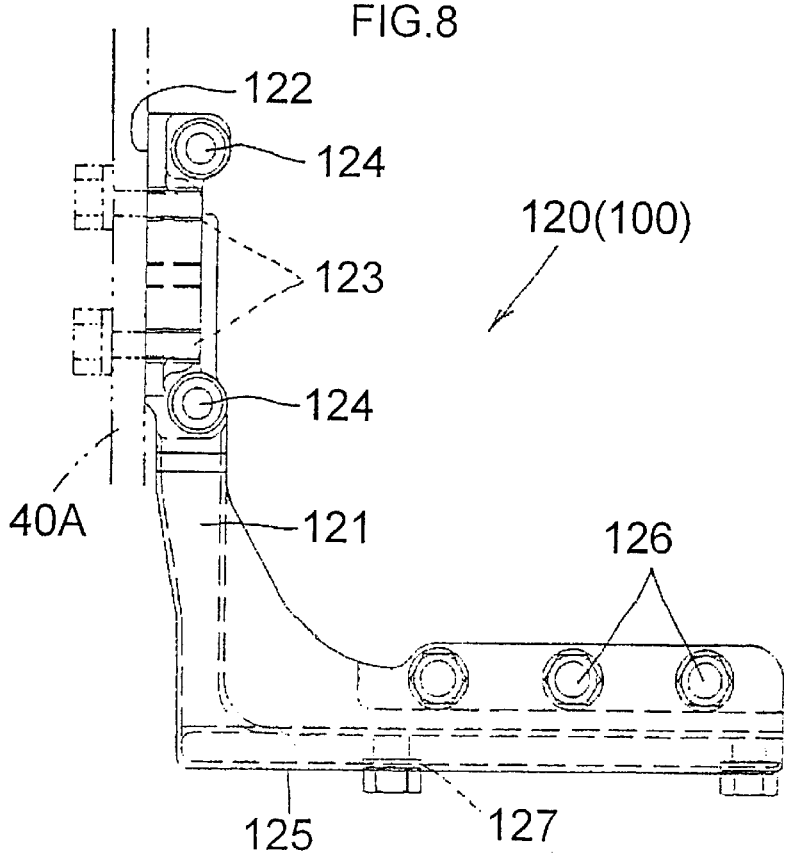

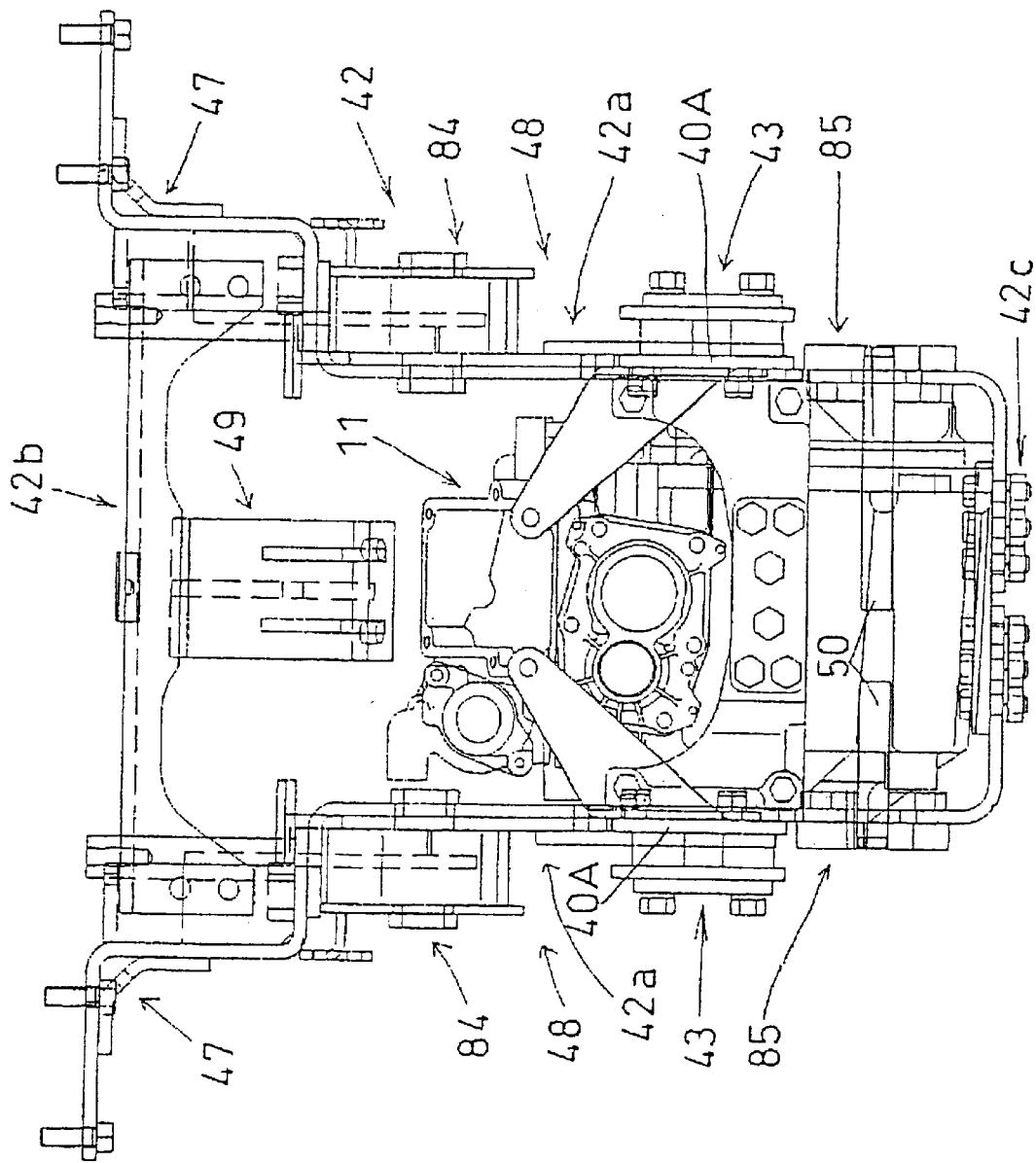

TRACTOR WITH IMPLEMENT MOUNTING FRAME

BACKGROUND OF THE INVENTION

1. Field of the Invention

This invention relates to a technique for attaching working implements such as a front loader, a backhoe and a mower unit to a frame type tractor having an engine mounted in a front region and a transmission case in a rear region of a main frame extending longitudinally of the tractor.

2. Description of the Related Art

As disclosed in Japanese Patent Laying-Open Publication No. 2000-273901 and U.S. Pat. No. 6,056,502, for example, a complex working vehicle called a TLB (tractor-loader-backhoe) is known that has a front loader attached to the front of a tractor, and a backhoe attached to the rear of the tractor. This TLB has a tractor body of monocoque construction (integral construction) with a clutch housing connected to the rear wall of an engine, and a transmission case connected to the clutch housing. The tractor body is reinforced by reinforcing frames extending longitudinally thereof. The front loader is attached to forward portions of the reinforcing frames, while the backhoe is attached to rear portions of the reinforcing frames. In this type of TLB, the tractor body and the reinforcing frames bear their shares of loads such as excavating forces occurring during a backhoe operation, and loading forces occurring during a loader operation.

Japanese Patent Laying-Open Publication H11-332346 discloses a frame type tractor having an engine is mounted in a front region and a transmission case in a rear region of a body frame formed of a pair of right and left plates connected together by cross members. A mower unit may be suspended from an intermediate portion of the body frame. However, the body frame of such a frame type tractor is not very rigid, and attaching a backhoe to the rear of the body frame has been considered impossible. This is because, where a backhoe is attached to the rear of the body frame, torsional loads are applied from the backhoe to the body frame during a backhoe operation, and such loads act on a connection between the body frame and the transmission case and on the transmission case in a serious way. Further, the body frame requires a rollover protection system to be attached to a rear portion thereof. A technique is desired that reinforces the body frame in an efficient way, i.e. without unduly entailing complications of the body frame structure, weight increase or cost increase.

SUMMARY OF THE INVENTION

The object of this invention is to provide an efficient frame reinforcement for a frame type tractor having an engine mounted in a front region and a transmission case in a rear region of a main frame extending longitudinally of the tractor, thereby allowing working implements such as a front loader, a backhoe and a mower unit to be attached to the tractor.

The above object is fulfilled, according to this invention, by a frame type tractor having a backhoe mounting frame attached to a rear end of a main frame, and rollover protection system mounts arranged in upper portions of the backhoe mounting frame for fixedly supporting a rollover protection system. In this construction since a backhoe unit and a rollover protection system are attached to the same mounting frame, strength against reactions from the backhoe unit and strength of the rollover protection system mounts may be considered at the same time. Thus, an efficient reinforcement may be provided. For example, the rollover protection system also may be considered a strength member against reactions from the backhoe unit.

In a preferred embodiment of this invention, the backhoe mounting frame has a frame structure defining an inner space therein and including a pair of right and left side walls, a top wall interconnecting upper ends of the side walls, and a bottom wall interconnecting lower ends of the side walls, and the right and left side walls have the rollover protection system mounts and backhoe attaching portions for engaging and connecting the backhoe unit. This construction greatly increases the strength of the rollover protection system and the strength against reactions from the backhoe unit acting sideways.

Further, the backhoe mounting frame may include a top link mount for attaching a top link of a three-point link mechanism, and lower link mounts for attaching lower links of the three-point link mechanism, at least part of the transmission case being fitted in the inner space of the backhoe mounting frame. Then, an efficient reinforcement may be provided to secure strength of the three-point link mechanism, besides securing the strength of the rollover protection system mounts. With the transmission case being fitted in the inner space of the backhoe mounting frame, forces acting on the transmission case are mitigated.

Further, the main frame may include a pair of right and left elongate members, the main frame being reinforced by a sub-frame including sub-elongate members arranged laterally outwardly of the elongate members and connected at opposite ends thereof to the elongate members, mower suspending mechanisms for suspending a mower unit being arranged each between one of the right and left elongate members and one of the right and left sub-elongate members. The sub-frame may effectively distribute a load received from the backhoe unit, and increase strength against torsional forces.

Where the elongate members of the main frame have the mower suspending mechanisms for suspending the mower unit, the sub-frame could be obstructive. However, a space for accommodating each mower suspending mechanism is formed between the right or left elongate member and the right or left sub-elongate member. It is thus possible to attach to the main frame the mower suspending mechanisms having a sufficient lifting height.

Rollover protection system mounts are provided for right and left props of the rollover protection system. These rollover protection system mounts are connected to each other. This further increases the strength of the rollover protection system against reactions from the backhoe unit acting sideways.

In a preferred embodiment of this invention, rear wheels are arranged laterally of the transmission case, the rear wheels, the backhoe mounting frame and the rollover protection system being arranged substantially in one vertical plane.

Despite the presence of the backhoe mounting frame, the distance between the transmission case and the rear end of the main frame is short. A weight balance does not deteriorate significantly even when the backhoe unit is attached.

In another embodiment of this invention, frame reinforcing units are provided for connecting upper portions of the backhoe mounting frame to portions of the main frame remote from the backhoe mounting frame. In this construction, the main frame, backhoe mounting frame, rollover protection system mounts and frame reinforcing units form a large truss structure in the rear of the main frame to secure strength of the rollover protection system against forces applied from rearward directions and to secure strength for withstanding a reaction from the backhoe unit attached to the rear of the main frame.

The object of this invention may be fulfilled also by a frame type tractor having a backhoe mounting frame attached to a rear end of a main frame, in which the main frame includes a pair of right and left elongate members, at least one cross member interconnecting the elongate members, and a first reinforcing cross unit and a second reinforcing cross unit interconnecting the elongate members forwardly and rearwardly of the transmission case. With this construction, excavating reactions occurring during an excavating operation performed by the attached backhoe unit are received by a frame structure formed of the right and left elongate members, the first reinforcing cross unit and the second reinforcing cross unit. Since no great load is applied to the transmission case, the transmission case may be formed of a light alloy such as an aluminum alloy, to contribute to lightening of the tractor body.

Each of the first reinforcing cross unit and the second reinforcing cross unit may have an integral construction. However, each cross unit, preferably, includes two substantially L-shaped halves respectively having vertical portions and horizontal portions, the two halves being connectable to and disconnectable from each other. Then, any assembly errors in the elongate members and transmission case may be absorbed reliably and efficiently by using assembly jigs and the like. The first reinforcing cross unit and second reinforcing cross unit may be formed of a pressed material or cut plate. However, the cross units, preferably, are formed of cast steel (or other cast material). This provides an advantage in production (manufacture) while securing sufficient rigidity.

The frame type tractors to which the above reinforcing technique is applied according to this invention may have a front loader attached to the front, the rollover protection system and backhoe unit to the rear, and the mower unit to an intermediate portion.

Other features and advantages of this invention will be apparent from the following description of the embodiment to be taken with reference to the drawings.

BRIEF DESCRIPTION OF THE DRAWINGS

FIG. 7 is a rear view showing one half of a first reinforcing cross unit;

FIG. 8 is a rear view showing the other half of the first reinforcing cross unit;

FIG. 9 is a rear view of the transmission region of the body frame;

DESCRIPTION OF THE PREFERRED EMBODIMENT

An embodiment of this invention will be described hereinafter with reference to the drawings.

Figure 1:
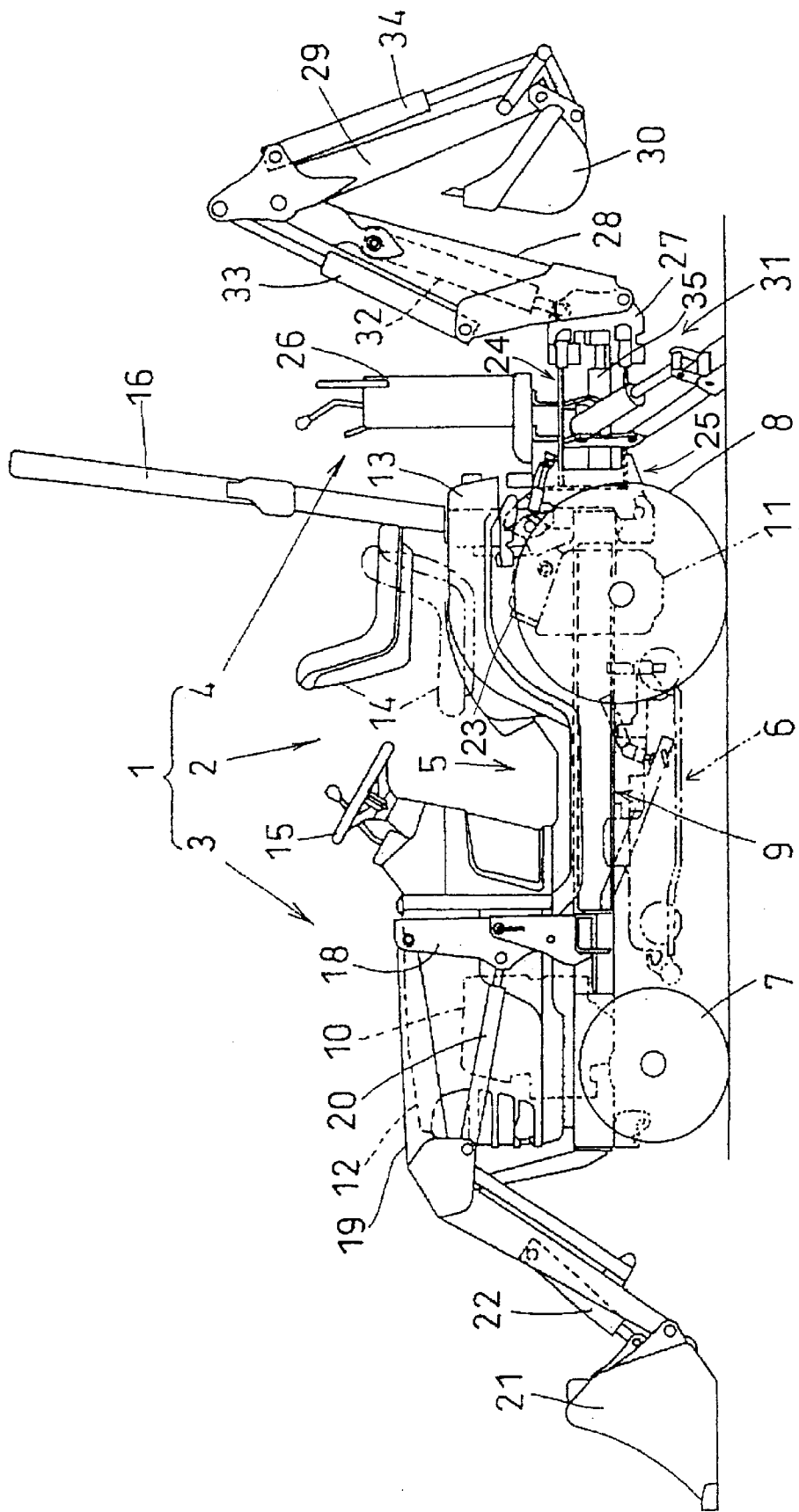
FIG. 1 is a side elevation of a TLB according to this invention.

FIG. 1 shows a multipurpose tractor 1 called a TLB (tractor-front loader-backhoe) in which a tractor 2 has a front loader 3 attached to the front thereof and a backhoe unit 4 attached to the rear end. A mower unit 6 may be detachably attached under a longitudinally intermediate portion of the tractor 2.

Figure 2:
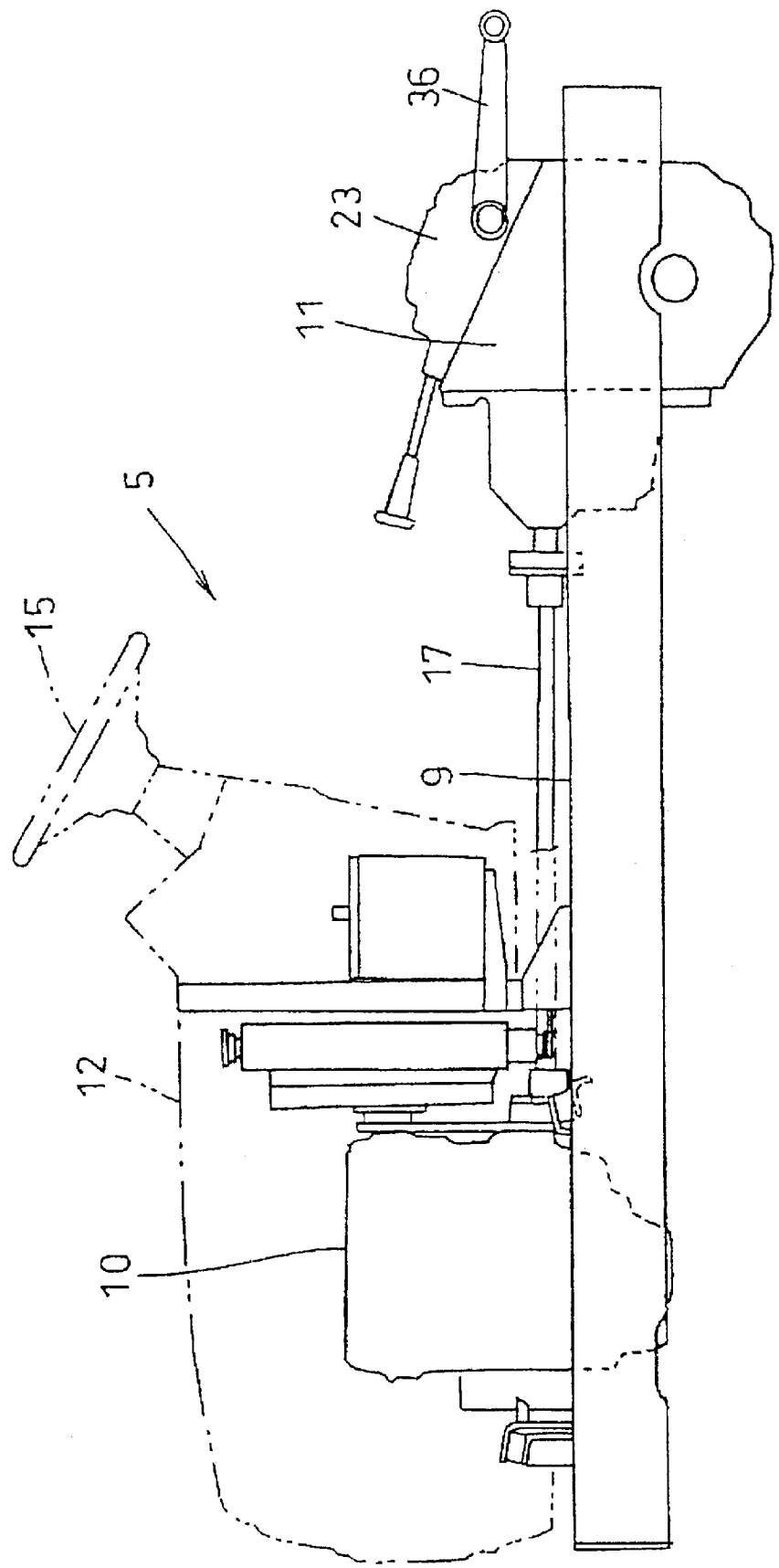
FIG. 2 is a side view of a body frame of a tractor forming part of the TLB.

This tractor 2 is a small, light, frame type tractor. The tractor 2 includes a body 5, and dirigible front wheels 7 and rear drive wheels 8 for supporting and propelling the body 5. As shown in FIG. 2, the body 5 has a body frame 9, an engine 10 mounted in a front region of the body frame 9, and a transmission case 11 mounted in a rear region thereof.

The engine 10 has an output shaft disposed in a lower rear position thereof. Torque is transmitted from this output shaft through a drive shaft 17 to a transmission mechanism in the transmission case 11. A hydraulic device 23 is mounted on the transmission case 11 for raising and lowering a working implement. Lift arms 36 are connected to right and left sides of the hydraulic device 23 to be pivotable upward by hydraulic pressure.

The front wheels 7 are arranged at right and left sides of the engine 10. The rear wheels 8 are arranged at right and left sides of the transmission case 11 to be rotatable by drive from the transmission case 11.

A hood 12 is disposed in the front region of the body 5 for enclosing the engine 10 and other components. A driver's seat 14 is disposed between right and left rear wheel fenders 13 covering the right and left rear wheels 8. The driver's seat 14 is reversible between a forward facing position and a rearward facing position. A steering wheel 15 is disposed forwardly of the driver's seat 14. A rollover protection system 16 is mounted on the body 5 rearwardly of the driver's seat 14. The transmission case 11 is made by aluminum die casting in this embodiment.

The front loader 3 includes side frames 18, booms 19 pivotally attached to upper portions of the side frames 18 to be swingable about a transverse axis, boom cylinders 20 extending between the side frames 18 and intermediate portions of the booms 19 for moving the booms 19 up and down. These components are arranged at right and left sides of the hood 12. A bucket 21 is mounted between forward ends of the right and left booms 19 to take scooping and dumping action. A bucket cylinder 22 extends between the booms 19 and bucket 21 for operating the bucket 21.

The backhoe unit 4 includes a base 24, a connecting bracket 25 fixed to the front thereof, a control column 26 mounted on the base 24, a boom bracket 27 pivotally supported by the rear of the base 24 to be swingable about a vertical swing axis, a boom 28 pivotally supported by the boom bracket 27 to be swingable about a transverse axis, an arm 29 attached to a distal end of the boom 28 to be swingable about a transverse axis, a bucket 30 attached to a distal end of the arm 29 to take scooping and dumping action, and outriggers 31 arranged at right and left sides of the base 24.

The base 24 includes a swing cylinder 35 for swinging the boom bracket 27 right and left about the vertical swing axis. A boom cylinder 32 is mounted between the boom bracket 27 and boom 28 for vertically swinging the boom 28. An arm cylinder 33 is mounted between the boom 28 and arm 29 for swinging the arm 29. A bucket cylinder 34 is mounted between the arm 29 and bucket 30 for operating the bucket 30. Each of the right and left outriggers 31 includes a leg having an end thereof attached to the base 24 to be vertically pivotable about a fore and aft axis, and the other end having a ground engaging plate, and a hydraulic cylinder mounted between the leg and the base 24 for vertically swinging the leg.

Figure 3:
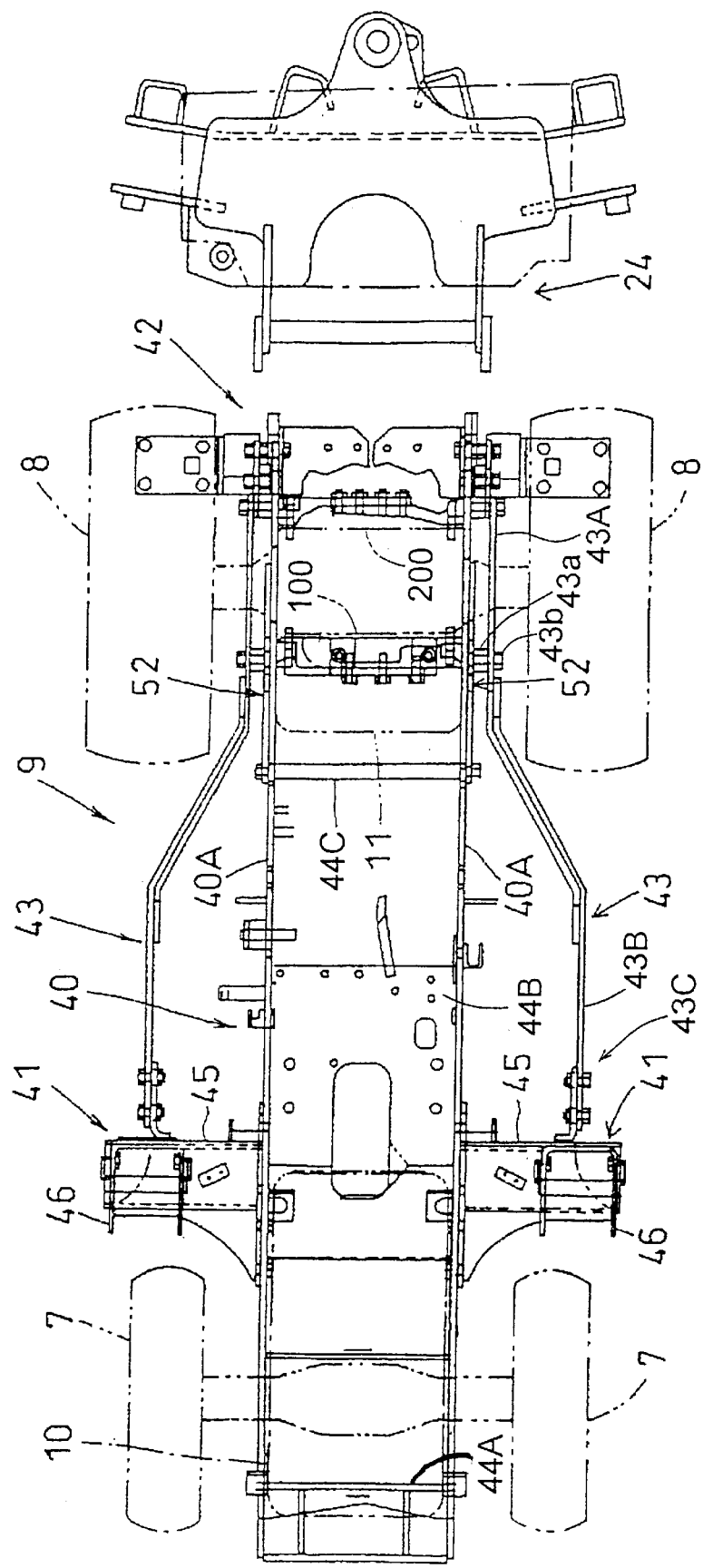
FIG. 3 is a plan view of the body frame and a backhoe base.
Figure 4:
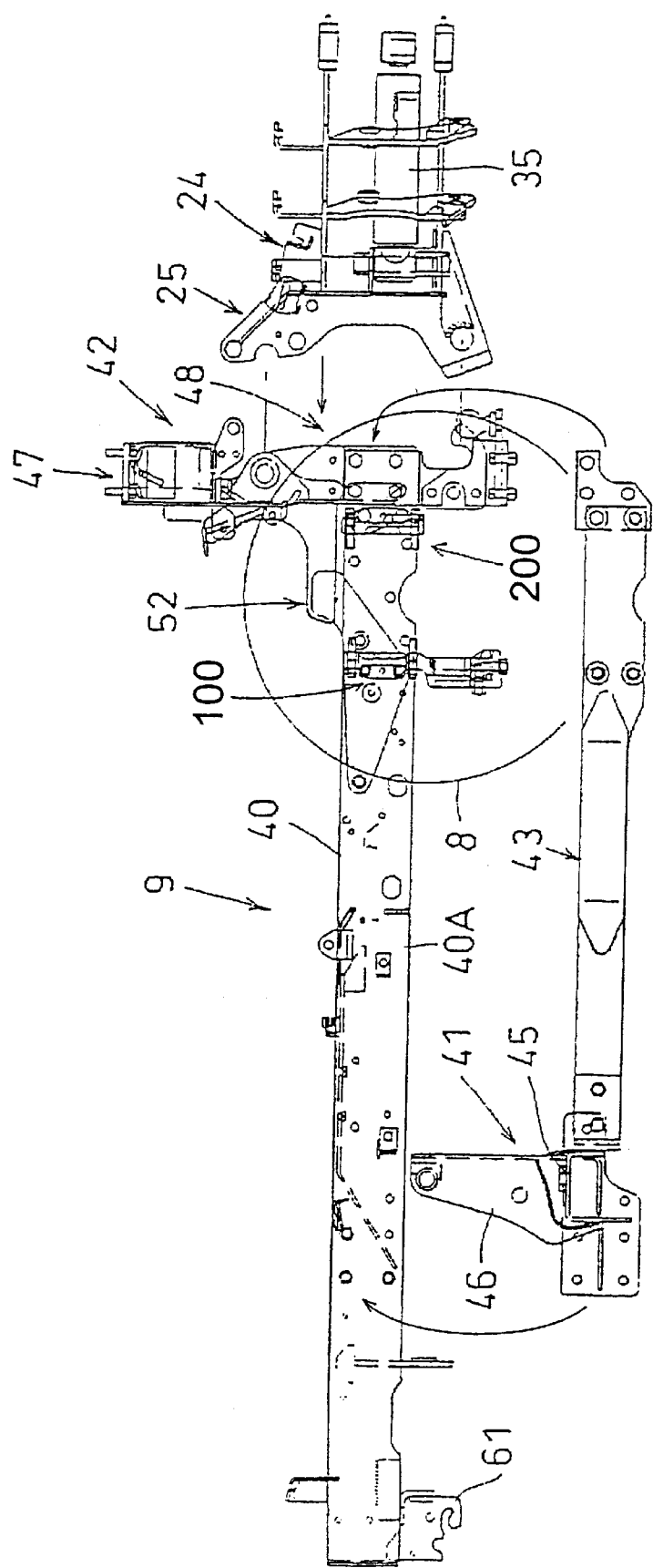
FIG. 4 is a side view of the body frame and the backhoe base.
Figure 5:
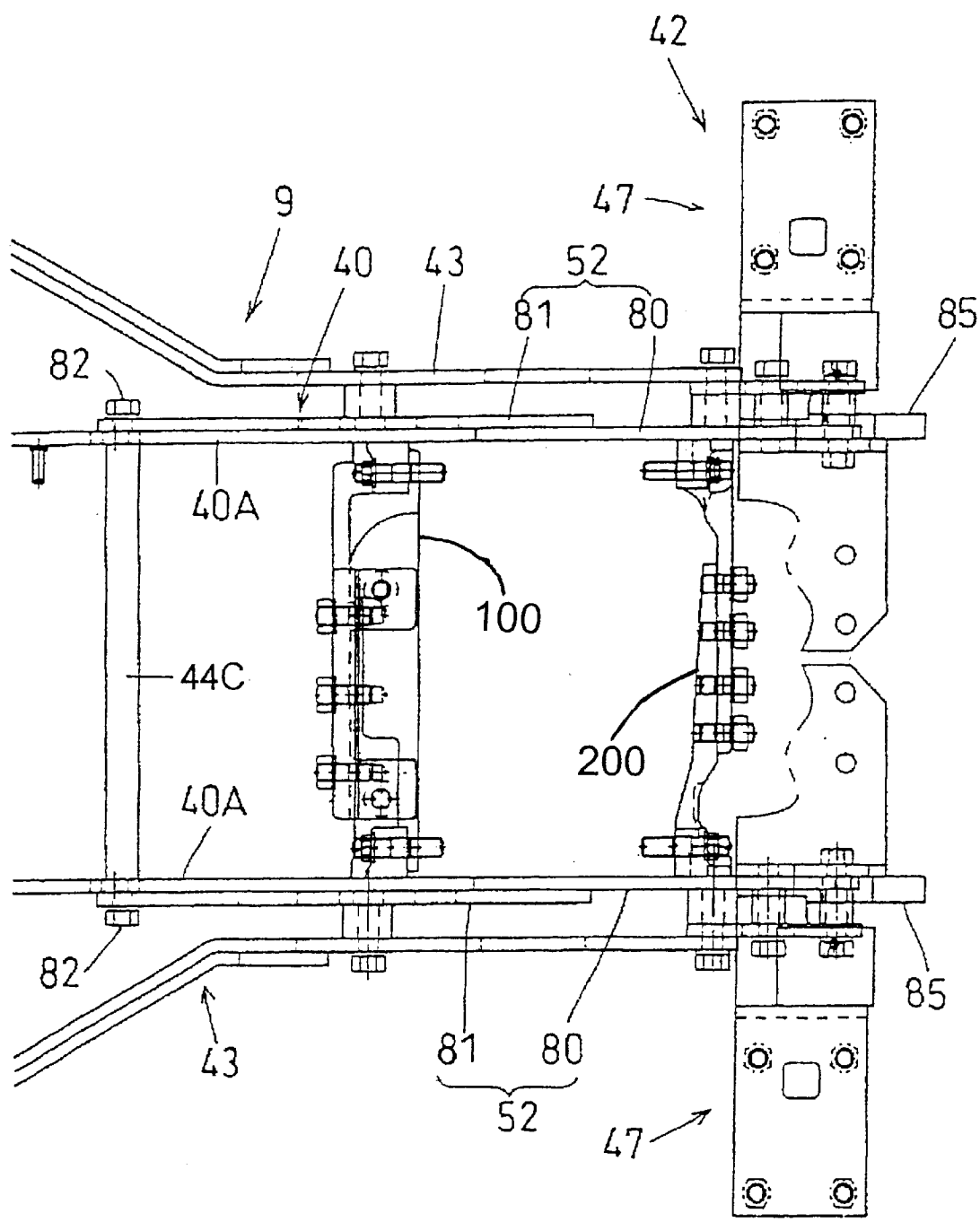
FIG. 5 is a plan view of a rear portion of the body frame.
Figure 6:
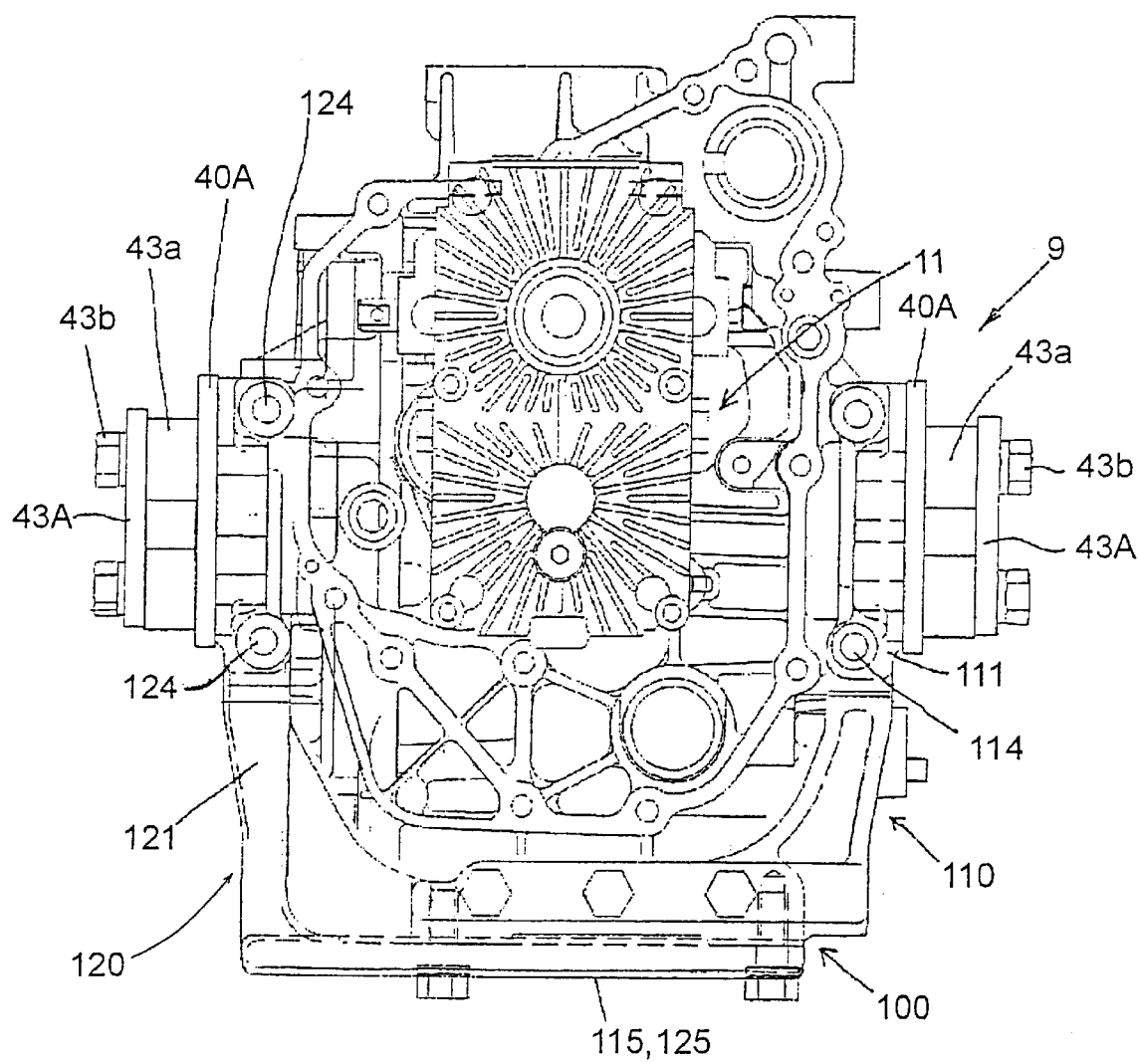
FIG. 6 is a front view of a transmission region of the body frame.
Figure 10:
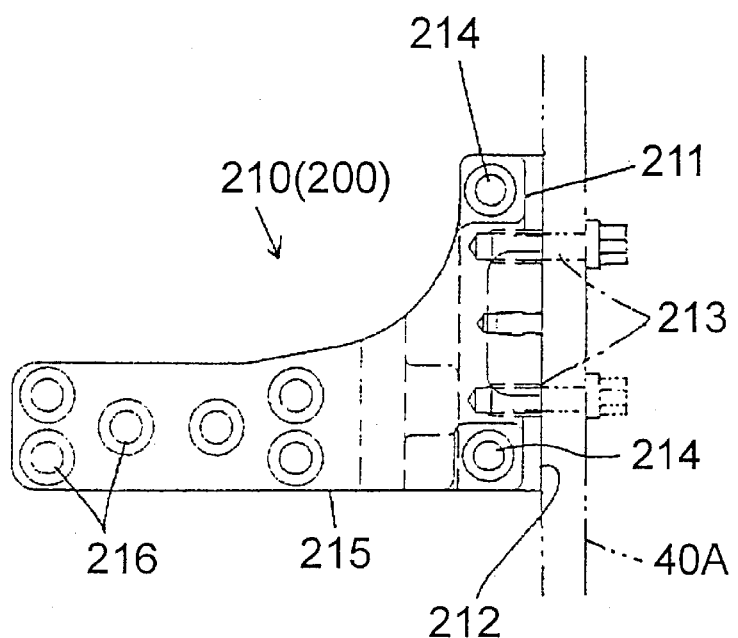
FIG. 10 is a front view showing one half of a second reinforcing cross unit.
Figure 11:
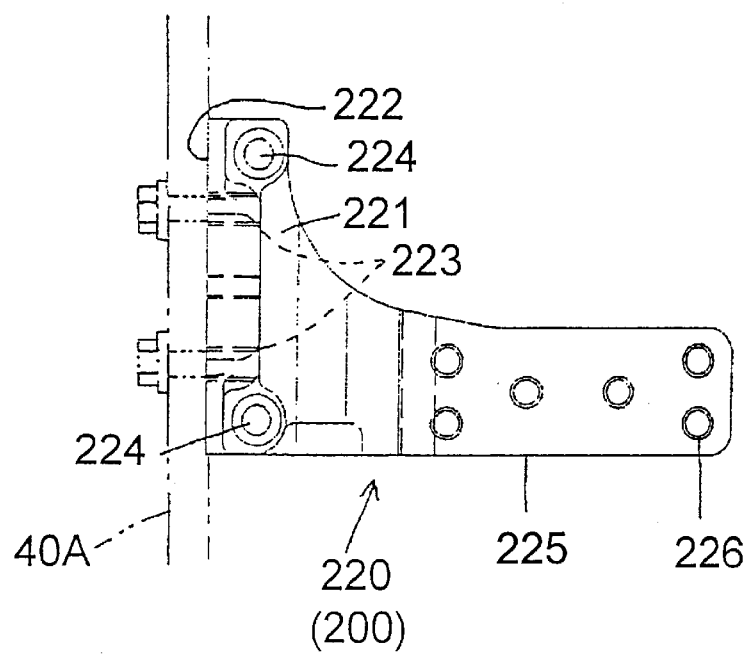
FIG. 11 is a front view showing the other half of the second reinforcing cross unit.

As seen from FIGS. 3 and 4, the body frame 9 of the frame type tractor 2 includes a main frame 40, sub-frames 43 and a backhoe mounting frame 42 attached to the rear end of the main frame 40. The main frame 40 includes a pair of right and left elongate members 40A extending parallel to each other in the fore and aft direction with a spacing therebetween. In this embodiment, the elongate members 40A are formed of flat plate. Further, loader support frames 41 are attached to a forward region of the main frame 40 to extend laterally outwardly from opposite sides thereof. The loader support frames 41 are arranged rearwardly of the engine 10 and front wheels 7. Each loader support frame 41 includes a bracket 45 projecting laterally outwardly of one of the elongate members 40A, and a mounting member 46 fixed to and projecting upward from the bracket 45. Each side frame 18 of the front loader 3 is detachably attached to a respective one of the mounting members 46.

The main frame 40 further includes a cross bar 44A interconnecting forward portions of the elongate members 40A which are formed of band plate (iron plate, steel plate or the like), a cross plate 44B interconnecting middle portions of the elongate members 40A, and a cross bar 44C interconnecting rearward portions of the elongate members 40A. With the connecting structure including these cross members and backhoe mounting frame 42, a high degree of torsional rigidity is secured for the main frame 40.

In the front region of the main frame 40, the engine 10 is supported in four; (right, left, front, and rear) portions thereof through rubber mounting elements acting as engine mounts to isolate vibration. In the rear region of the main frame 40, the transmission case 11 is supported with the aid of a first reinforcing cross unit 100 and a second reinforcing cross unit 200 arranged forwardly and rearwardly of the transmission case 11.

Each of the right and left sub-frames 43 includes a first plate 43A and a second plate 43B formed of thinner plate (iron plate or steel plate) than the elongate members 40A of the main frame 40, and fixed together over fore and aft lengths of horizontally bent portions. Each first plate 43A is connected to a rear portion of one of the elongate members 40A by bolts 43b with spacer collars 43a mounted therebetween. Each second plate 43B bulging laterally outwardly through the bent portion is connected to the bracket 45 of one of the loader support frames 41 through a flange-bolt joint 43C. With this bent portion, each sub-frame 43 has a longitudinally intermediate portion thereof inclined to shift laterally outwardly as it extends forwardly. Thus, the sub-frames 43 have a large spacing in the forward portion from the main frame 40 and a small spacing in the rearward portion from the main frame 40.

That is, each of the right and left sub-frames 43 is disposed laterally of and spaced from one of the elongate members 40A to connect the backhoe mounting frame 42 and the rear portion of the main frame 40 (elongate members 40A) to the loader support frames 41 (brackets 45). With this construction, a load applied from the backhoe unit 4 to the body frame 9 is distributed to the main frame 40 and sub-frames 43. This realizes an increased strength against torsion.

The first reinforcing cross unit 100 and second reinforcing cross unit 200 will be described next with reference to FIGS. 6 through 11. These cross units 100 and 200 serve to reinforce the main frame 40 around the transmission case 11.

The first reinforcing cross unit 100 and second reinforcing cross unit 200 are similar and will be described en bloc. The first and second reinforcing cross units 100 and 200 connect the right and left elongate members 40A of the main frame 40 to each other and to the transmission case 11 with bolts or the like. Each of the cross units 100 and 200 may have a one-piece structure, but preferably has a right and left split structure to be capable of absorbing an assembly error, a dimensional error and the like, and easy to assemble. This embodiment therefore employs a right and left split structure, i.e. having two halves.

The first and second reinforcing cross unit 100 and 200, respectively, include two approximately L-shaped halves 110, 120; 210, 220 having vertical portions 111, 121; 211, 221 and horizontal portions 115, 125; 215, 225. The vertical portions each have a seating surface 112, 122; 212, 222 opposed to one of the elongate members 40A, and a plurality of mounting bores 113, 123; 213, 223 arranged vertically for bolting the seating surface to an inner surface of the respective elongate member 40A. The vertical portions also have mounting bores 114, 124; 214, 224 arranged above and below the mounting bores 113, 123; 213, 223 for bolt connection to the transmission case 11. The horizontal portions 115, 125; 215, 225 having mounting bores 116A, 126; 216, 226 for bolt connection to each other as placed one forwardly of the other (the horizontal portions of the first reinforcing cross unit 100 having also lower surfaces overlapping each other). The horizontal portions of the first reinforcing cross unit 100 having also mounting bores 116B, 127 for receiving bolts in the vertical direction to be connected to each other.

The first and second reinforcing cross units 100 and 200, respectively, have the horizontal portions 115, 125; 215, 225 overlapping each other and disconnectably connected to each other by bolts, and the vertical portions 111, 121; 211, 221 contacting (overlapping) the right and left elongate members 40A of the main frame 40 and the transmission case 11 and disconnectably connected thereto by bolts. The transmission case 11 is placed in a square frame structure produced by the first and second reinforcing cross units 100 and 200 and the right and left elongate members 40A. Thus, the structure, though lightweight, can fully withstand an excavating reaction such as a torsional or bending force transmitted thereto.

The first and second reinforcing cross units 100 and 200 may be formed of sheet metal, but preferably are formed of cast steel (cast metal) from the point of view of strength.

The vertical portions of the first reinforcing cross unit 100 are elongated to guard lower front parts of the transmission case 11. The vertical portions of the second reinforcing cross unit 200 are short. The reason for this is that the backhoe mounting frame is disposed immediately rearwardly of the second reinforcing cross unit 200.

In addition, the horizontal portions of the halves of the first and second reinforcing cross units 100 and 200 may be connected not only to each other but also to the transmission case 11 by bolts or the like.

Figure 12:
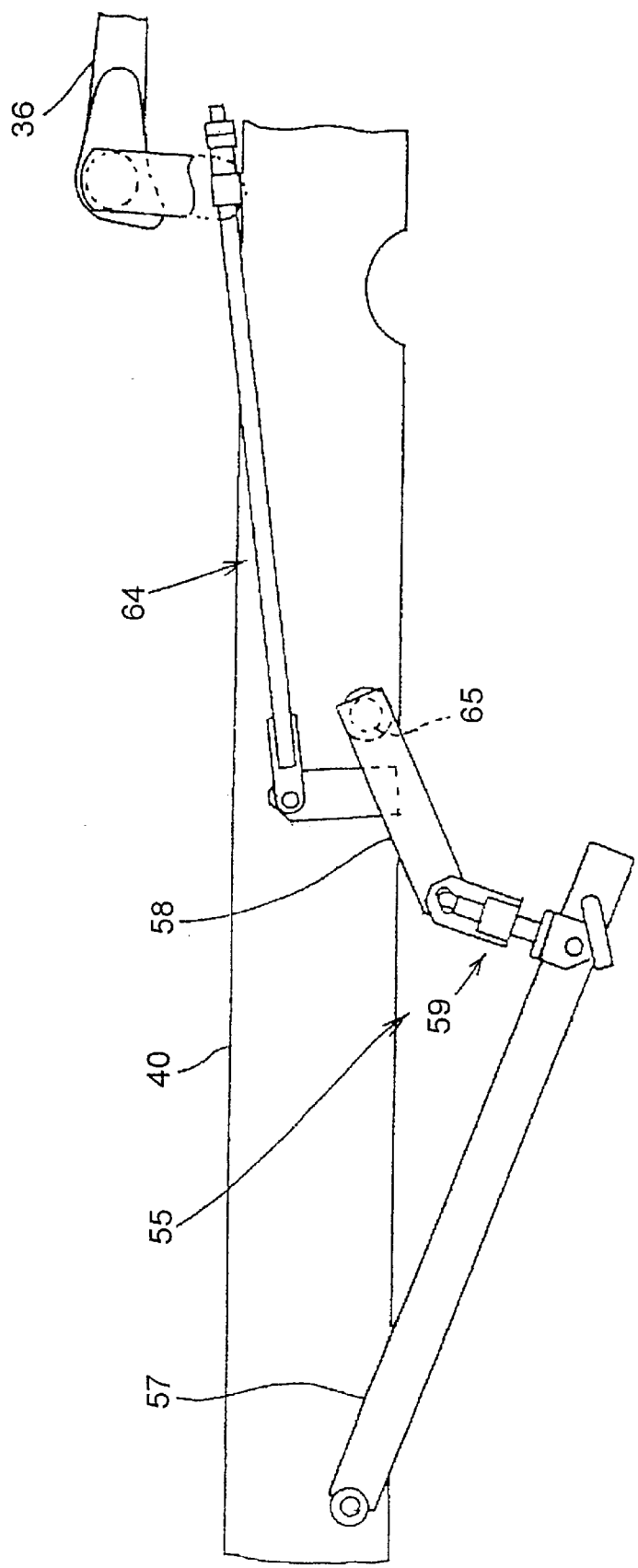
FIG. 12 is a right side view showing suspending mechanisms and raising and lowering mechanisms of a mower unit.
Figure 13:
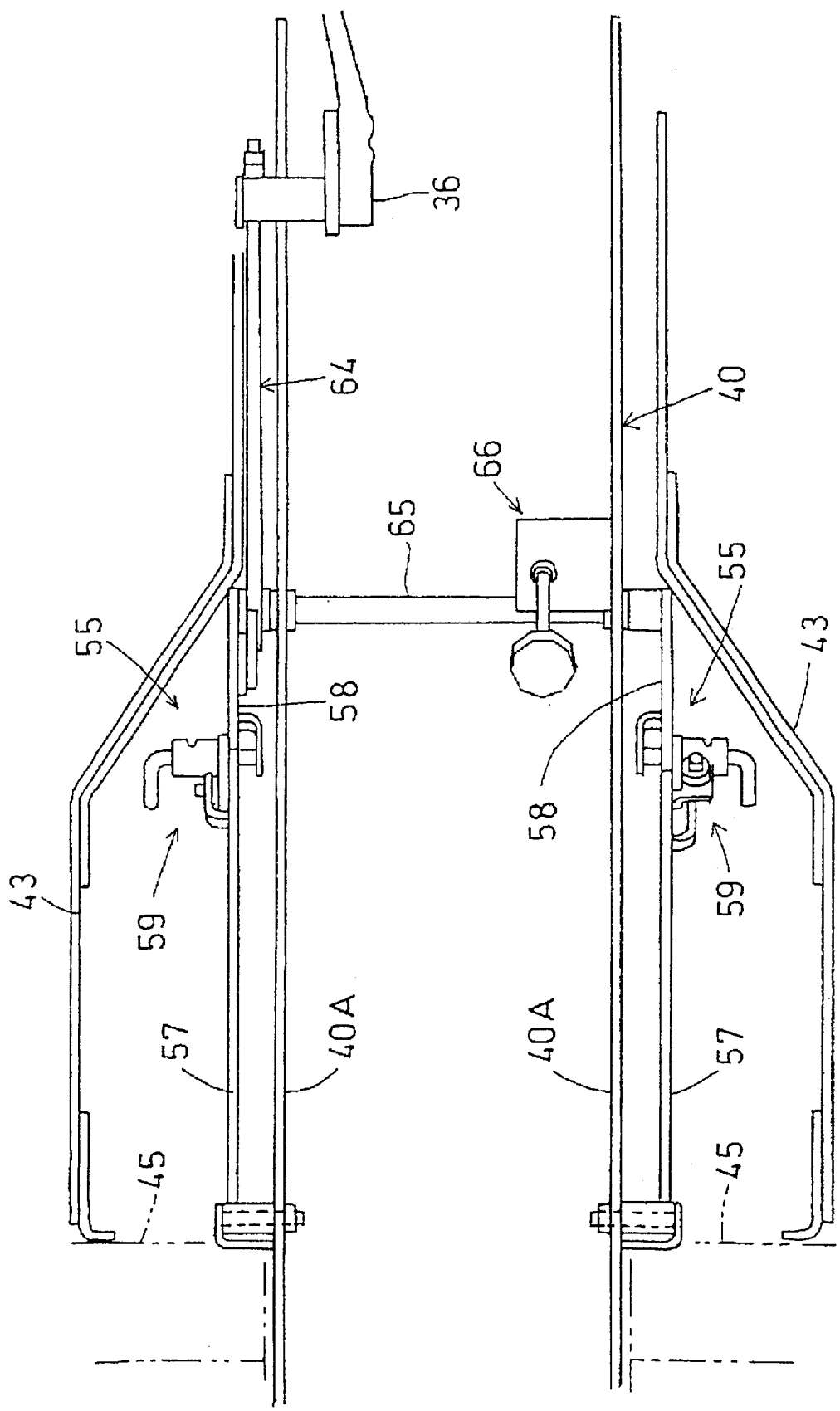
FIG. 13 is a plan view showing the suspending mechanisms and raising and lowering mechanism of the mower unit.
Figure 14:
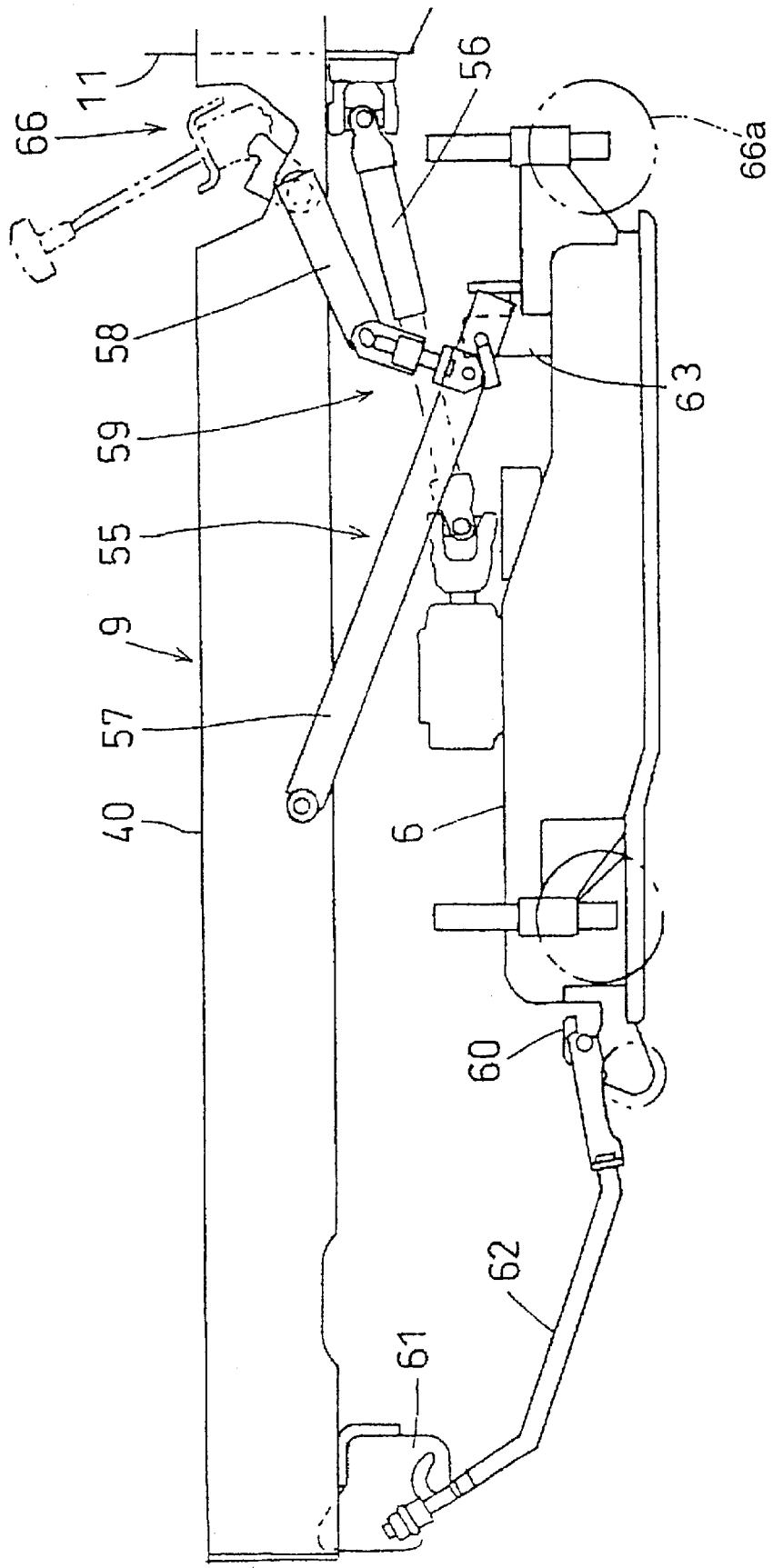
FIG. 14 is a side view showing the mower unit and suspending mechanisms.
Figure 15:
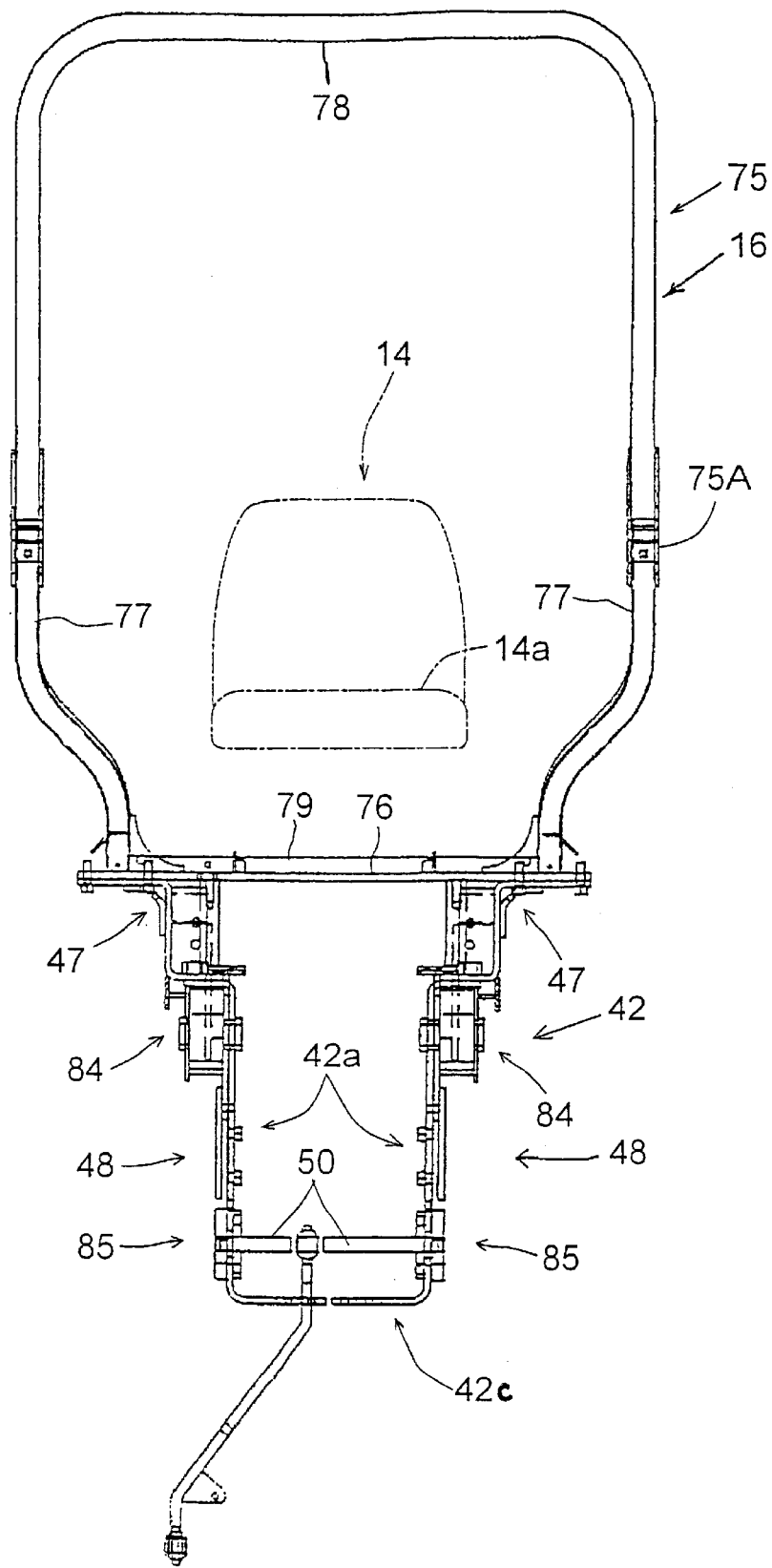
FIG. 15 is a rear view of a mounting frame and a rollover protection system.
Figure 16:
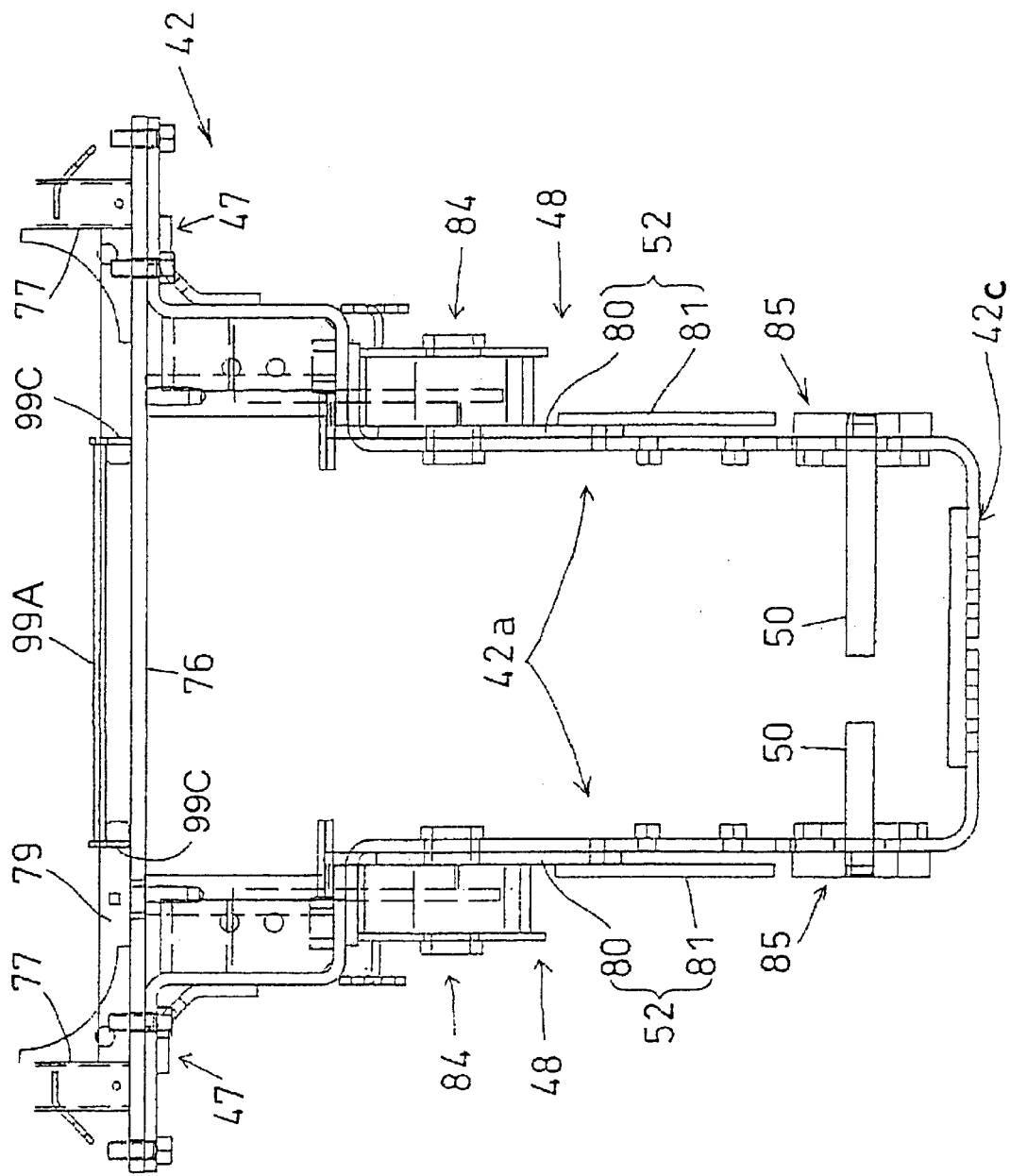
FIG. 16 is a rear view of the mounting frame and a lower portion of the rollover protection system.

As shown in FIGS. 12 through 14, a pair of right and left mower suspending mechanisms 55 for supporting the rear of mower unit 6 are arranged in forward portions of large spacing between the sub-frames 43 and main frame 40. Each suspending mechanism 55 includes a swing link 57 pivotally supported at a forward end thereof by one of the frame members 40A to be vertically swingable, a lift arm 58 pivotally supported at a rear end thereof by the respective frame member 40A to be vertically swingable, a coupling 59 for connecting a rear end region of swing link 57 to a forward end of lift arm 58. The rear ends of right and left swing links 57 are pivotally attached to brackets 63 disposed in rear portions of mower unit 6. Numeral 66 denotes a cutting height adjusting device for adjusting a cutting height by varying the height of a pair of right and left gauge wheels 66a.

The front of mower unit 6 is suspended by a pair of right and left suspender links 62 extending between brackets 61 disposed in forward end regions of the right and left frame member 40A and brackets 60 disposed at right and left sides of a front end of the mower unit 6. The right and left suspender links 62 and the right and left swing links 57 constitute a parallelogram link mechanism for supporting the mower unit 6 to be capable of parallel movement up and down.

The right and left lift arms 58 are interconnected by a support shaft 65 to be swingable together. The lift arms 58 are operatively connected to the lift arms 36 of the hydraulic device 23 on the transmission case 11 through an interlocking device 64. Thus, the mower unit 6 is vertically movable by the hydraulic device 23.

The mower unit 6 includes rotary blades mounted in a blade housing. These blades are rotatable by drive transmitted through a drive shaft 56 from a PTO shaft projecting from a lower front position of the transmission case 11.

As shown in FIGS. 15 through 18, the backhoe mounting frame 42 includes rollover protection system mounts 47 for attaching the rollover protection system 16, and backhoe attaching portions 48 for attaching the backhoe unit 4. By forming the backhoe attaching portions 48 and rollover protection system mounts 47 on the same frame, an efficient reinforcement is provided to secure strength against a reaction from the backhoe unit 4 and strength of the rollover protection system mounts 47 at the same time. The rollover protection system 16 may also be made a strength member against the reaction from the backhoe unit 4.

Further, the backhoe mounting frame 42 includes a top link mount 49 for attaching a top link of a three-point link mechanism, and lower link mounts 50 for attaching lower links of the three-point link mechanism, so that a working implement (e.g. a rotary implement) other than the backhoe unit 4 may be vertically movably attached to the rear of tractor 2.

By forming these top link coupling 49 and lower link couplings 50 on the backhoe mounting frame 42, an efficient reinforcement is provided to secure strength of the three-point link mechanism besides the strength against a reaction from the backhoe unit 4 and strength of the rollover protection system mounts 47.

The backhoe mounting frame 42 is disposed between, and interconnects, the rear ends of the right and left elongate members 40A of the main frame 40.

The backhoe mounting frame 42 has a rectangular shape in rear view including a pair of right and left side walls 42a bolted to the right and left elongate members 40A of the main frame 40, a top wall 42b interconnecting upper ends of the right and left side walls 42a, and a bottom wall 42c interconnecting lower ends of the right and left side walls 42a. The backhoe mounting frame 42 is constructed to secure sufficient strength against a reaction from the backhoe unit 4 acting laterally thereof as well as strength of the rollover protection system.

The rollover protection system mounts 47 are disposed at the upper ends of the right and left side walls 42a, respectively. The backhoe attaching portions 48 are disposed below the rollover protection system mounts 47 (i.e. the rollover protection system mounts 47 are disposed above the backhoe attaching portions 48). Thus, the rollover protection system mounts 47 and backhoe attaching portions 48 are formed in right and left pairs.

Figure 17:
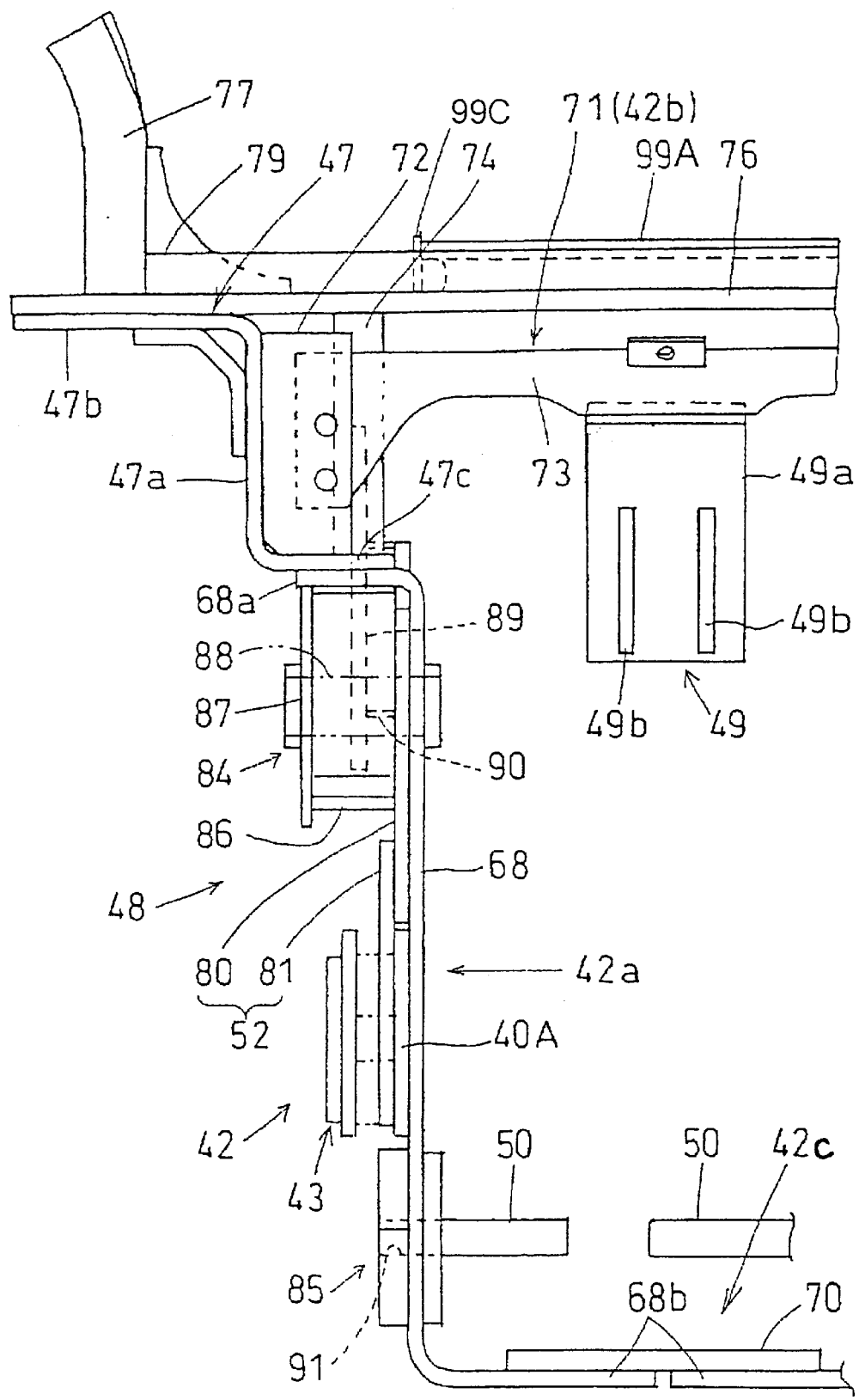
FIG. 17 is a rear view of the mounting frame and a lower portion of the rollover protection system.
Figure 18:
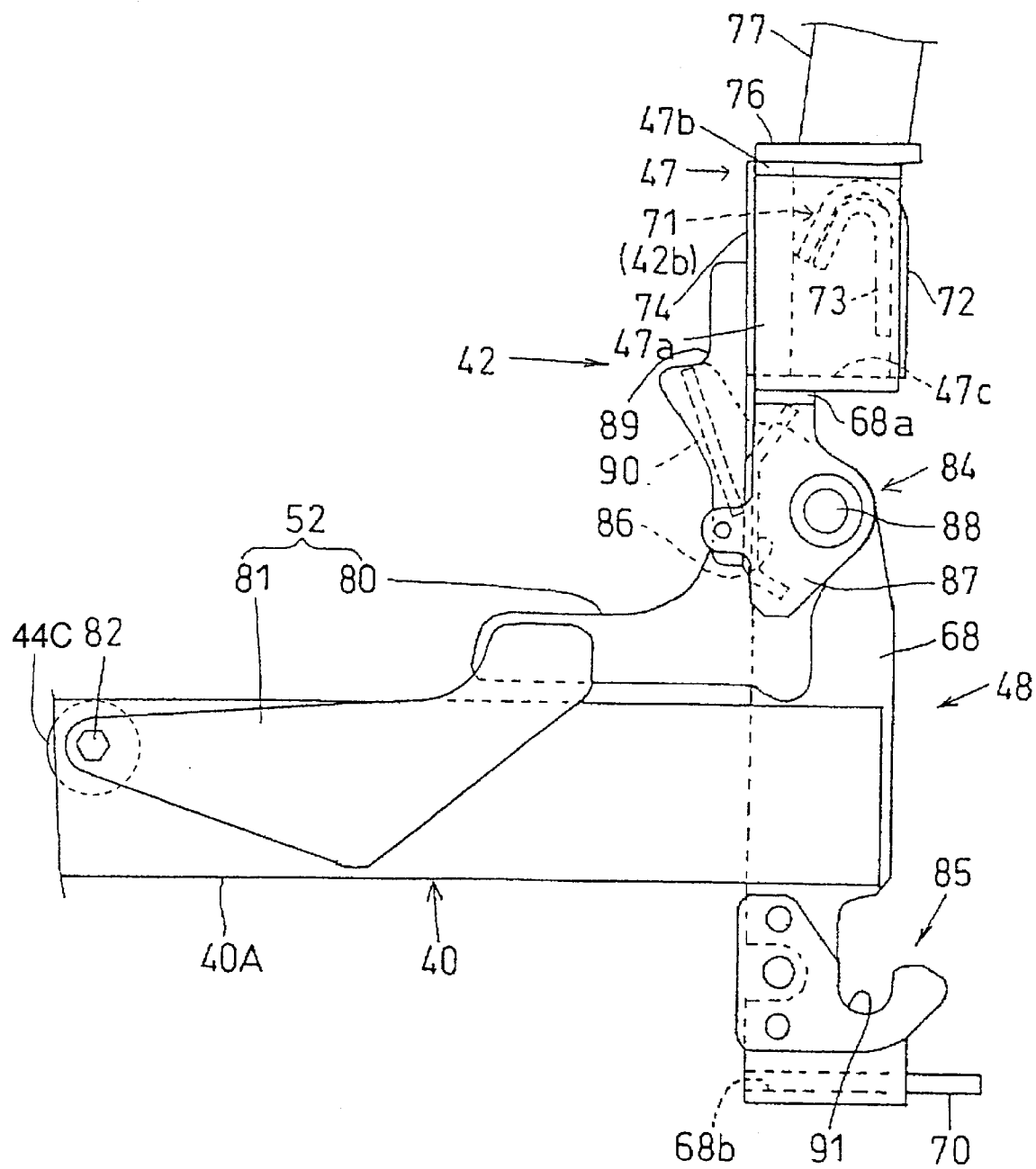
FIG. 18 is a side view of the rear portion of the body frame.
Figure 19:
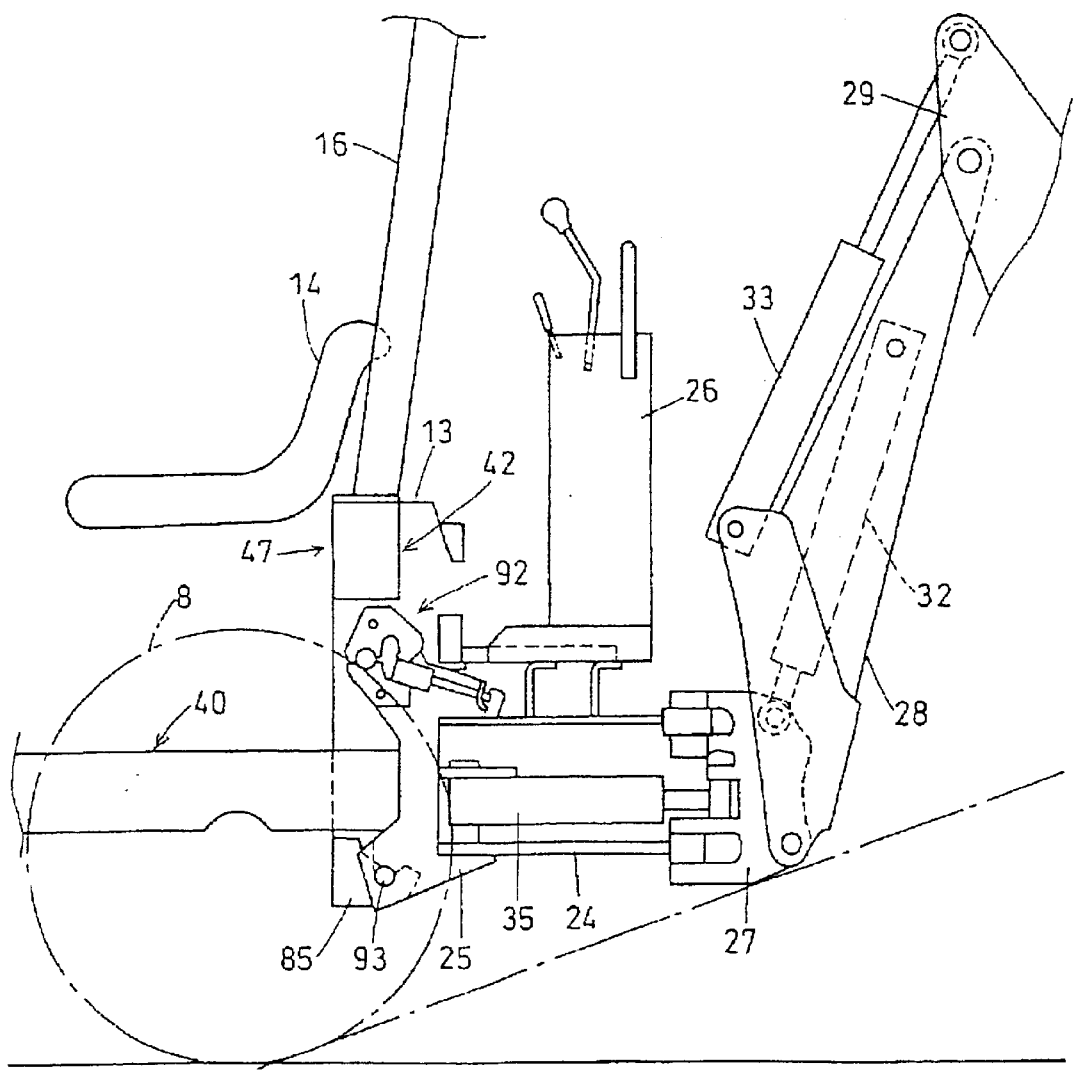
FIG. 19 is a side view of the backhoe attached to the mounting frame.

As shown in FIG. 17 the top link coupling 49 includes a support plate 49a fixed to a middle position in the right and left direction of the top wall 42b of the backhoe mounting frame 42, and a pair of right and left brackets 49b fixed to the support plate 49a. A front connecting portion of the top link is pivotally attached by a pin between the right and left brackets 49b.

The lower link couplings 50 are in the form of rods fixed to, and projecting inwardly from, lower positions of the right and left side walls 42a of the backhoe mounting frame 42.

The transmission case 11 is contained in the backhoe mounting frame 42 as seen in rear view. This reduces a force acting on the transmission case 11, allowing the transmission case 11 to be lightweight.

The backhoe mounting frame 42 has the right and left side walls 42a fixed in vertically intermediate positions thereof to the elongate members 40A and extending upward from the main frame 40. The right and left rollover protection system mounts 47 arranged on the upper end of the backhoe mounting frame 42 are connected to portions of the right and left elongate members 40A of the main frame 40 forwardly of the backhoe mounting frame 42 by right and left frame reinforcing units 52. The main frame 40 (elongate members 40A), backhoe mounting frame 42, rollover protection system mounts 47 and frame reinforcing units 52 form a large truss structure in the rear of body frame 9 to secure strength of the rollover protection system against forces applied from rearward directions and to secure strength for withstanding a reaction from the backhoe unit 4.

The right and left elongate members 40A are interconnected in positions thereof forwardly of the transmission case 11 by a cross rod 44C consisting of a tie rod or the like. Forward ends of the frame reinforcing units 52 are connected where the cross rod 44C is connected to the main frame 40. With the right and left rollover protection system mounts 47 connected to the right and left ends of the cross rod 44C by the right and left frame reinforcing units 52, the body frame 9 has a greatly increased rigidity against torsional loads.

The construction of the backhoe mounting frame 42 win be described in greater detail hereinafter.

The backhoe mounting frame 42 is formed by fixedly connecting a plurality of plate members as by welding. The backhoe mounting frame 42 has a pair of right and left side plates 68. Each of the side plates 68 has an upper portion bent to project laterally outward, a lower portion bent to project laterally inward, and a vertically intermediate portion in contact with an inner surface of the elongate member 40A of the main frame 40 and bolted to the elongate member 40A.

Bent horizontal projections 68a at the upper ends of the right and left side plates 68 are fixed to the rollover protection system mounts 47 (rollover protection system supports). Bent horizontal projections 68b at the lower ends of the right and left side plates 68 are connected together by a connecting plate 70.

Each rollover protection system mount 47 includes a vertical web 47a, a top web 47b extending laterally outward from the upper end of the vertical web 47a, and a bottom web 47c extending laterally inward from the lower end of the vertical web 47a. The bottom web 47c is superposed on the upper horizontal projection 68a of the side plate 68 and fixed thereto by welding, for example. The rollover protection system 16 is fixed to the top web 47b.

The right and left rollover protection system mounts 47 are interconnected by a connector 71. The connector 71 includes mounting members 72 each fixed as by welding to the vertical web 47a and bottom web 47c of one of the rollover protection system mounts 47, and a transverse member 73 disposed between the right and left rollover protection system mounts 47 and bolted to the mounting members 72. The mounting members 72 and transverse member 73 have curved tops. A rollover protection system support member 74 is fixedly mounted as by welding on the bottom web 47c of each rollover protection system mount 47.

The side plates 68 and rollover protection system mounts 47 form the side walls 42a of the backhoe mounting frame 42. The connector 71 forms the top wall 42b. The bent horizontal projections 68b of the side plates 68 and the connecting plate 70 form the bottom wall 42c.

The rollover protection system 16 includes a main body 75 of inverted U-shape, and a base member 76 interconnecting lower ends of the main body 75. The main body 75 of the rollover protection system includes right and left props 77, and a cross member 78 extending between upper ends of the right and left props 77. The lower ends of props 77 are connected by the base member 76. The main body 75 and base member 76 form a square frame to secure strength. The lower ends of the right and left props 77 are interconnected by a reinforcing member 79 fixedly mounted on the base member 76 as by welding.

Each of the right and left props 77 includes a flex portion 75A formed in a longitudinally intermediate position thereof. Thus, the rollover protection system 75 may be reduced to a compact form by bending the props 77 forward in the flex portions 75A. The flex portions 75A are constructed to maintain the right and left props 77 in upright posture while allowing the props 77 to be pivotable about a sideways axis in the longitudinally intermediate position.

The base member 76 to which the lower end of rollover protection system 75 is attached has a right and left length smaller than a right and left width (spacing between the right and left prop 77) at the top of rollover protection system 75, to suit the small tractor. The right and left props 77 attached to the short base member 76 have a spacing between the lower ends thereof shorter than (or the same as) the base member 76.

The right and left props 77 are curved to have an enlarged spacing therebetween as they extend upward from the lower ends. The props 77 are curved below the flex portions 75A. More specifically, as seen from FIG. 15, the props 77 are curved in positions at substantially the same height as a seating surface 14a of the driver's seat 14 facing rearward.

Thus, the right and left props 77 have a narrow spacing between the lower ends thereof, but a sufficiently large spacing between portions thereof above the seating surface 14a of the driver's seat 14. Through the large spacing between the right and left props 77, the driver may stretch his or her legs from the driver's seat 14 to a footrest of the backhoe unit 4, and may extend his or her arms from the driver's seat 14 to the control column 26. The driver may engage in an operation without a feeling of pressure.

When boarding and alighting from the footrest, the driver moves between the right and left props 77 of rollover protection system 75 to sit on or leave the driver's seat 14. Since the props 77 are wide apart, the driver may move therebetween with ease.

As shown in FIG. 1, when the backhoe unit 4 is attached to the tractor 2, the control column 26 disposed in a middle position in the fore and aft direction above the base 24 of the backhoe unit 4 lies rearwardly away from the rollover protection system 75. Thus, when a backhoe operation is carried out with the driver's seat 14 facing rearward, a large spacing between the driver's seat 14 and the footrest provides a large accommodating space. The driver may place his or her legs comfortably, and may board and alight from the tractor 2 with ease.

The base member 76 is placed on the top webs 47b of right and left rollover protection system mounts 47 and the rollover protection system support members 74, and fixed to the top webs 47b by bolts and nuts. The base member 76 is fixed also to the rollover protection system support members 74 by bolts.

Thus, the rollover protection system mounts 47 are connected also by the base member 76 connecting the lower ends of the right and left props 77 of rollover protection system 16. With the right and left rollover protection system mounts 47 connected to each other, strength is secured against forces acting laterally of the rollover protection system 16, and sufficient strength is secured against forces laterally applied from the backhoe unit 4. Moreover, the strength against forces acting laterally may be increased greatly by the double connection structure with the right and left rollover protection system mounts 47 interconnected by the base member 76 and the connector 71.

Each rear wheel fender 13 has a top web thereof fixedly pinched between the top web 47b of one of the right and left rollover protection system mounts 47 and the base member 76 of rollover protection system 16.

Each of the right and left frame reinforcing units 52 includes a rear, first reinforcing plate 80 disposed above the elongate member 40A and fixed to an outer surface of side plate 68 as by welding, and a front, second reinforcing plate 81 fixed to an outer surface of the elongate member 40A as by welding.

The first reinforcing plate 80 has a lower portion extending forward from the side plate 68. The second reinforcing plate 81 has a rear portion protruding above the main frame 40. The lower portion of the first reinforcing plate 80 and the rear portion of the second reinforcing plate 81 overlap each other and are fixed together as by welding. The forward end of the second reinforcing plate 81 is connected to the cross rod 44C by a bolt 82 extending through the second reinforcing plate 81 and elongate member 40A and screwed into a threaded bore formed in the cross rod 44C. The first reinforcing plate 80 is fixed to the side plate 68, and connected through side plate 68 to the rollover protection system mount 47. However, the first reinforcing plate 80 may be connected directly to the rollover protection system mount 47. The first reinforcing plate 80 and second reinforcing plate 81 may be formed integrally (i.e. formed of one-piece plate).

As shown in FIGS. 17 through 21, each of the right and left backhoe attaching portions 48 has an upper coupling 84 disposed in an upper portion of the side plate 68, and a lower coupling 85 disposed in a lower portion of the side plate 68.

The upper coupling 84 includes a reinforcing member 86 fixed as by welding to an outer surface of the first reinforcing plate 80 of the frame reinforcing unit 52 and to the bent horizontal projection 68a at the upper end of the side plate 68, a support wall 87 opposed to the outer surface of the first reinforcing plate 80 of the frame reinforcing unit 52 and fixed as by welding to the reinforcing member 86 and the bent horizontal projection 68a at the upper end of the side plate 68, and a connecting pin 88 extending between the support wall 87 and first reinforcing plate 80.

The reinforcing member 86 is connected to the rollover protection system support member 74 by a reinforcing member 89. The reinforcing member 89 is connected to the first reinforcing plate 80 of frame reinforcing unit 52 by a reinforcing member 90.

The lower coupling 85 is hook-shaped, defining a receiving portion 91 in the form of a recess opening upward. The lower coupling 85 is bolted to a lower position on the outer surface of the side plate 68.

Figure 20:
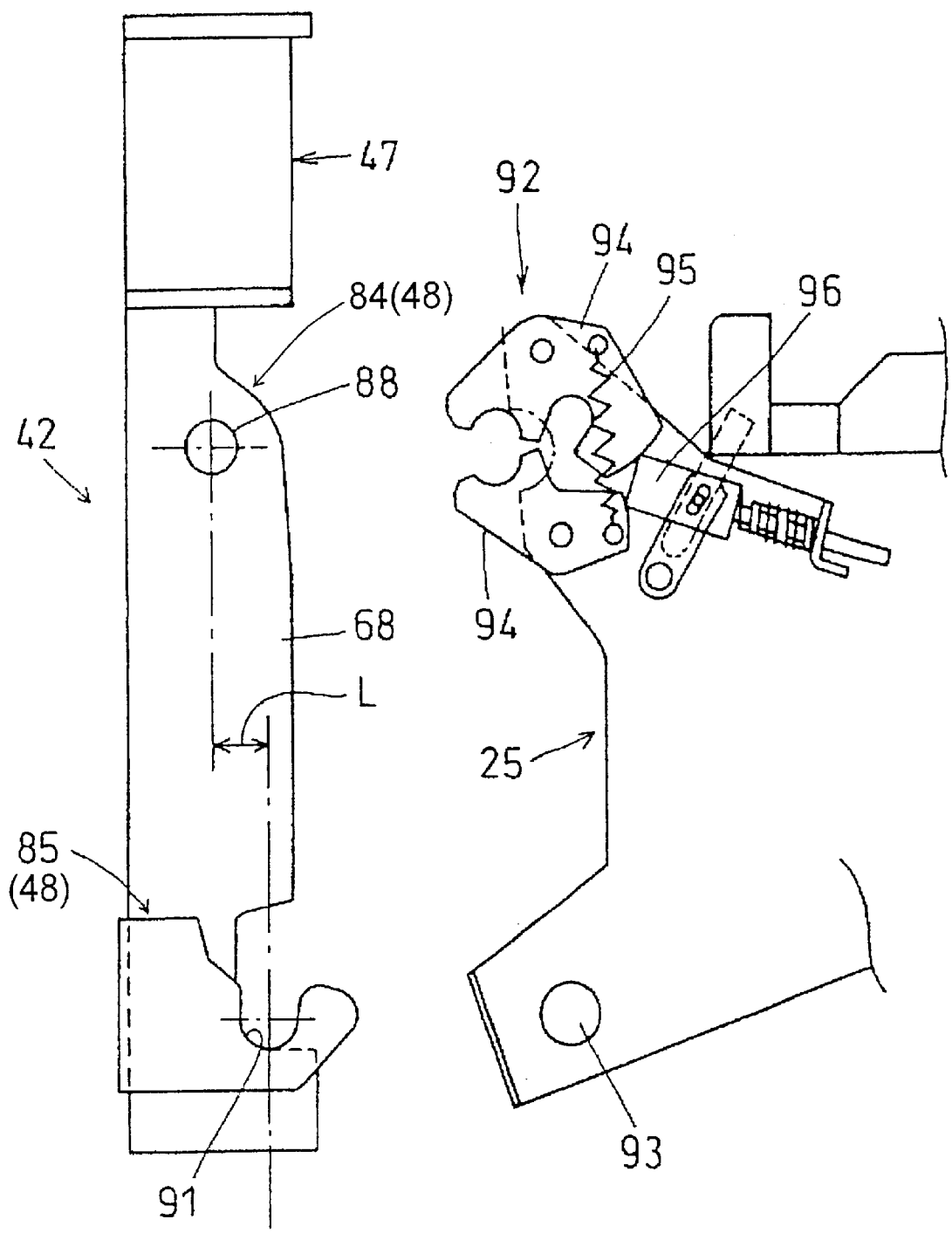
FIG. 20 is a side view showing a connection structure of the backhoe.

As shown in FIG. 20, the connecting pin 88 is disposed forwardly of a position right over the receiving portion 91, so that the backhoe unit 4 may be brought as close to the tractor 2 as possible. In an ordinary procedure for attaching the backhoe unit 4, an engaging portion of the backhoe unit 4 is first connected to the lower couplings 85. The illustrated construction has the lower couplings 85 located in a rearward position which is close up as seen from rear. This facilitates an operation to attach the backhoe unit 4.

The connecting bracket 25 disposed at the front of the base 24 of the backhoe unit 4 has a pair of right and left upper engaging portions 92 for connection to the upper couplings 84 of the backhoe attaching portions 48. The connecting bracket 25 also has a lower engaging portion 93 for connection to the lower couplings 85 of the backhoe attaching portions 48.

Each upper engaging portion 92 includes a pair of upper and lower mount holders 94 pivotally supported in upper positions of connecting bracket 25 for gripping the connecting pin 88 therebetween, a spring 95 for biasing the mount holders 94 to an open position, and a lock member 96 for retaining the upper and lower holders 94 in a closed position.

The lower engaging portion 93 is in the form of a bar extending transversely of the backhoe unit 4 for fitting in the receiving portions 91 of the lower couplings 85.

When the backhoe unit 4 is detached from the tractor 2 as shown in FIG. 20, the mount holders 94 are maintained in the open position by the spring 95. The backhoe unit 4 rests with the right and left outriggers 31 and the bucket 30 contacting the ground.

When attaching the backhoe unit 4 in this state to the tractor 2, the lower engaging portion 93 is first fitted in the receiving portions 91 of the lower couplings 85 from above. At this time, the mount holders 94 are located rearwardly of the connecting pins 88.

Figure 21:
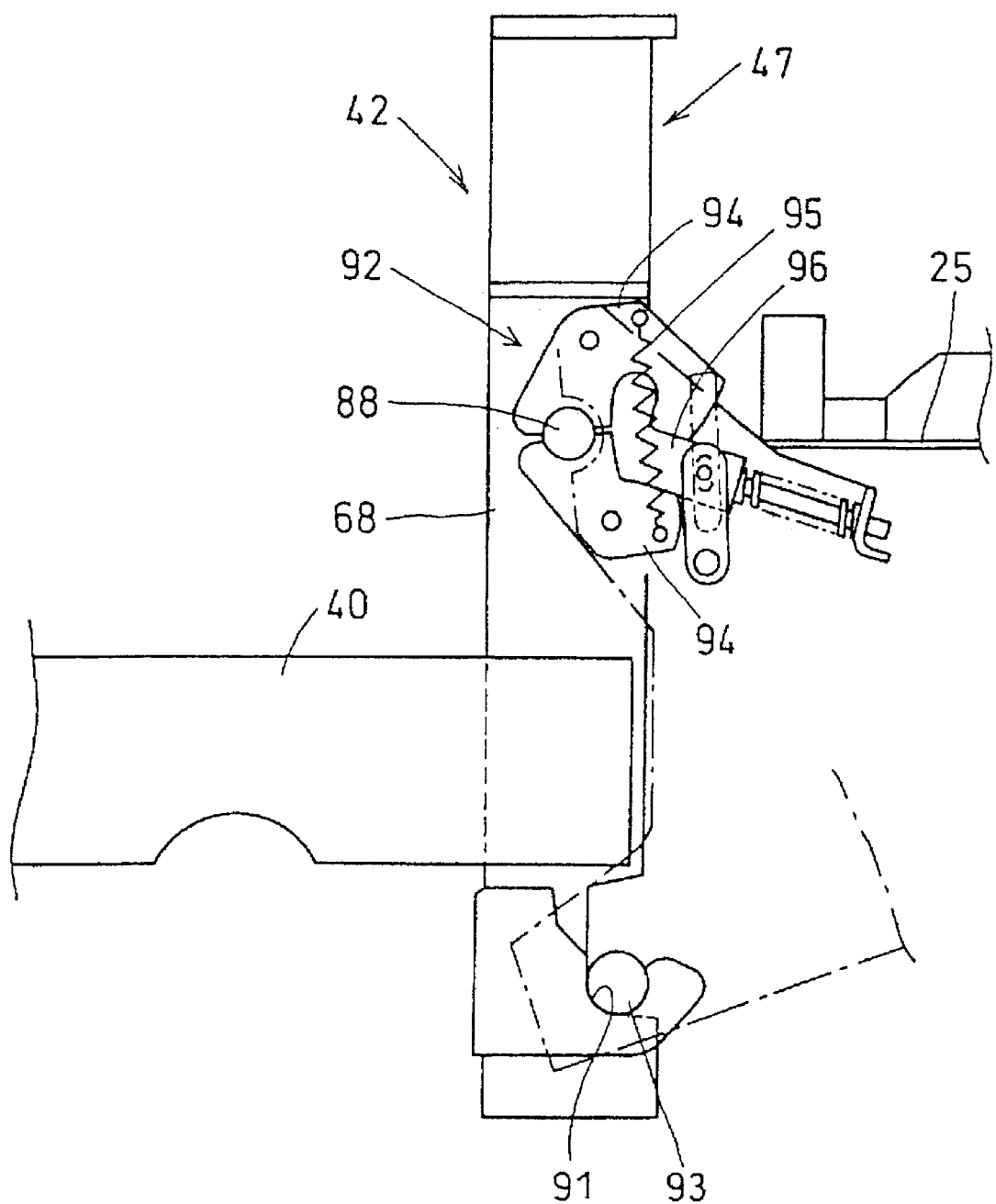
FIG. 21 is a side view showing the connection structure of the backhoe.

Next, when the base 24 of backhoe unit 4 is swung forword about the lower engaging portion 93, as shown in FIG. 21, each connecting pin 88 enters between the mount holders 94, and presses the mount holders 94. The mount holders 94 are thereby closed against the biasing force of spring 95, and the connecting pin 88 held between the pair of mount holders 94. At this time, the lock member 96 engages the rear faces of mount holders 94 to prevent opening of the mount holders 94.

With the above operation, the backhoe unit 4 is attached to the tractor 2.

To detach the backhoe unit 4, each lock member 96 is retracted rearwardly of the mount holders 94. In this state, an operation reversed from the above is carried out.

As seen from FIG. 1, the rear wheels 8 are arranged laterally of the transmission case 11. The rear wheels 8, backhoe mounting frame 42 and rollover protection system 16 are disposed substantially in the same vertical plane. More particularly, the backhoe mounting frame 42 including the lower couplings 85 and upper couplings 84 for connecting the backhoe unit 4 is, in side view, disposed between the axis of axles of the rear wheels 8 and the rear ends of the rear wheels 8, preferably closer to the rear ends of the rear wheels 8 than to the axle axis. With this construction, since the backhoe mounting frame 42 for attaching a working implement such as the backhoe unit 4 is located between the axle axis and the rear ends of the rear wheels 8, the backhoe unit 4 projects by a reduced length rearwardly of the tractor. Consequently the TLB 1 has a reduced total length.

Where the backhoe mounting frame 42 is closer to the rear ends of the rear wheels than to the axle axis, the backhoe mounting frame 42 is located in a position close up as seen from rear. This facilitates an operation to attach the backhoe unit 4 to the backhoe mounting frame 42.

Where the backhoe mounting frame 42 is disposed adjacent the rear ends of the rear wheel fenders 13, the backhoe unit 4 projects by a reduced length rearwardly of the tractor 2. Consequently the TLB 1 has a reduced total length. It is preferable that the backhoe mounting frame 42 is disposed forwardly of the rear ends of the rear wheel fenders 13.

Figure 22:
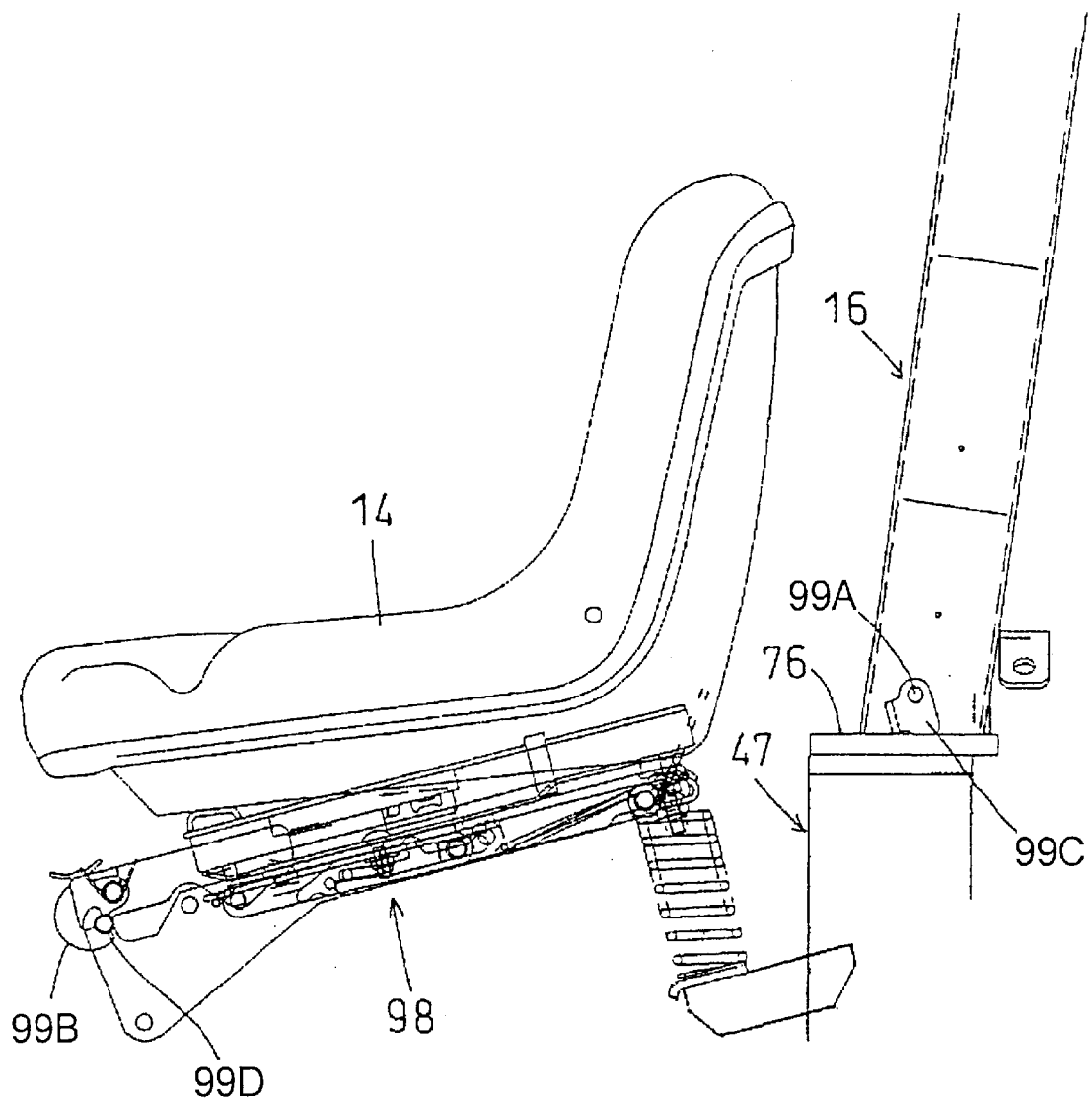
FIG. 22 is a side view of a driver's seat in a forward facing position.
Figure 23:
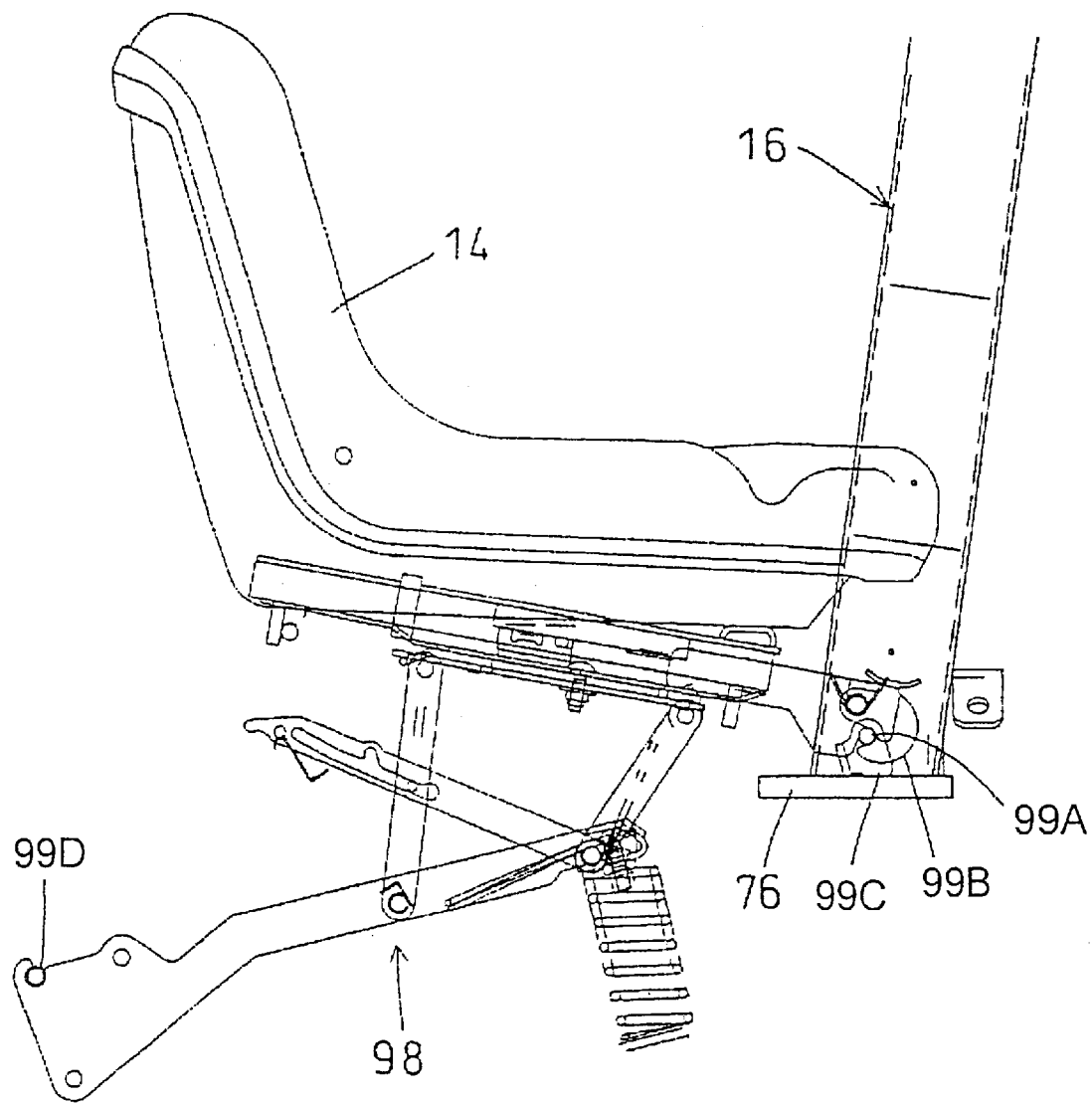
FIG. 23 is a side view of the driver's seat in a rearward facing position.

As shown in FIGS. 22 and 23, the driver's seat 14 is supported by a support device 98 to be switchable between a forward facing position and a rearward facing position. The driver's seat 14 has an engaging element 99B releasably engageable with an engaging element 99A disposed on the base member 76 of rollover protection system 16 to set the driver's seat 14 to the rearward facing position.

The engaging element 99A is in the form of a stainless steel rod extending between and fixed to a pair of right and left brackets 99C fixed to the base member 76 of rollover protection system 16. The engaging element 99B is in the form of a hook for removably engaging the engaging element 99A in the form of a rod.

When the driver's seat 14 is in the forward facing position, the engaging element 99B is releasably engageable with an engaging element 99D disposed to at the front of the support device 98 to set the driver's scat 14 to the forward facing position.

As noted above, the driver's seat 14 is switchable between the forward facing position and the rearward facing position. The engaging element 99A must be disposed on the tractor body for releasably engaging the engaging element 99B disposed on the driver's seat 14 to set the driver's seat 14 to the rearward facing position. By providing the engaging element 99A on the base member 76 of the rollover protection system, sufficient strength is secured for the mounting portion of the engaging element 99A, a saving is made in the number of components, and cost is reduced. Where the driver's seat 14 is switchable between the forward facing position and the rearward facing position, rust could be formed on the engaging element 99A engageable with the engaging element 99B of the driver's seat 14 to position the driver's seat 14. However, rust formation is avoided by forming the engaging element of stainless steel.

What is claim is:

1. A frame type tractor comprising:
   a main frame extending longitudinally of a tractor body;
   an engine mounted in a front region of said main frame;
   a transmission case mounted in a rear region of said main frame;
   a backhoe mounting frame attached to a rear end of said main frame;
   a rollover protection system including a pair of right and left props having upper ends thereof connected to each other, and a base member interconnecting lower ends of said right and left props: and
   rollover protection system mounts arranged in upper portions of said backhoe mounting frame for fixedly supporting said rollover protection system,
   wherein said rollover protection system mounts are provided in a right and left pair corresponding to said right and left props of said rollover protection system, said base member being fixedly attached to said rollover protection system mounts.

2. A frame type tractor as defined in claim 1, wherein:
   said backhoe mounting frame has a frame structure defining an inner space therein and including a pair of right and left side walls, a top wall interconnecting upper ends of said side walls, and a bottom wall interconnecting lower ends of said side walls; and
   said right and left side walls have said rollover protection system mounts and backhoe attaching portions for engaging and connecting a backhoe unit.

3. A frame type tractor as defined in claim 2, wherein said backhoe mounting frame includes a top link mount for attaching a top link of a three-point link mechanism, and lower link mounts for attaching lower links of the three-point link mechanism, at least part of said transmission case being fitted in said inner space of said backhoe mounting frame.

4. A frame type tractor as defined in claim 1, wherein said main frame includes a pair of right and left elongate members, said main frame being reinforced by a sub-frame including sub-elongate members arranged laterally outwardly of said elongate members and connected at opposite ends thereof to said elongate members, mower suspending mechanisms for suspending a mower unit each being arranged between one of said right and left elongate members and one of said sub-elongate members.

5. A frame type tractor as defined in claim 1, further comprising a connector for interconnecting said right and left rollover protection system mounts.

6. A frame type tractor as defined in claim 1, further comprising rear wheels arranged laterally of said transmission case, said rear wheels, said backhoe mounting frame and said rollover protection system being arranged substantially in one vertical plane.

7. A frame type tractor as defined in claim 1, further comprising frame reinforcing units for connecting upper portions of said backhoe mounting frame to portions of said main frame remote from said backhoe mounting frame.

8. A frame type tractor as defined in claim 7, wherein said main frame includes a pair of right and left elongate members, and a cross member interconnecting said elongate members, said frame reinforcing units being connected also to said cross member.

9. A frame type tractor comprising:
   a main frame extending longitudinally of a tractor body;
   an engine mounted in a front region of said main frame;
   a transmission case mounted in a rear region of said main frame; and
   a backhoe mounting frame attached to a rear end of said main frame,
   wherein said main frame includes a pair of right and left elongate members, at least one cross member interconnecting said elongate members, and a first reinforcing cross unit and a second reinforcing cross unit interconnecting said elongate members forwardly and rearwardly of said transmission case, and
   said first reinforcing cross unit and said second reinforcing cross unit are connected also to said transmission case.

10. A frame type tractor as defined in claim 9, wherein each of said first reinforcing cross unit and said second reinforcing cross unit includes two substantially L-shaped split members respectively having vertical portions and horizontal portions, said horizontal portions being connectable to and disconnectable from each other, said vertical portions being connectable to and disconnectable from said transmission case.

11. A frame type tractor as defined in claim 9, wherein said first reinforcing cross unit and said second reinforcing cross unit are formed of cast material.

12. A frame type tractor as defined in claim 9, wherein said elongate members are elongate plates.

13. A frame type tractor comprising:
   a main frame extending longitudinally of a tractor body;
   an engine mounted in a front region of said main frame;
   a transmission case mounted in a rear region of said main frame;
   a backhoe mounting frame attached to a rear end of said main frame; and
   rollover protection system mounts arranged in upper portions of said backhoe mounting frame for fixedly supporting a rollover protection system,
   wherein said main frame includes a pair of right and left elongate members, said main frame being reinforced by a sub-frame including sub-elongate members arranged laterally outwardly of said elongate members, mower suspending mechanisms for suspending a mower unit each being arranged between one of said right and left elongate members and one of said sub-elongate members.

14. A frame type tractor as defined in claim 13, wherein:

said backhoe mounting frame has a frame structure defining an inner space therein and including a pair of right and left side walls, a top wall interconnecting upper ends of said side walls, and a bottom wall interconnecting lower ends of said side walls; and said right and left side walls have said rollover protection system mounts and backhoe attaching portions for engaging and connecting a backhoe unit.

15. A frame type tractor as defined in claim 14, wherein said backhoe mounting frame includes a top link mount for attaching a top link of a three-point link mechanism, and lower link mounts for attaching lower links of the three-point link mechanism, at least part of said transmission case being fitted in said inner space of said backhoe mounting frame.

16. A frame type tractor as defined in claim 13, further comprising a connector for interconnecting said rollover protection system mounts.

17. A frame type tractor as defined in claim 13, further comprising rear wheels arranged laterally of said transmission case, said rear wheels, said backhoe mounting frame and said rollover protection system being arranged substantially in one vertical plane.

18. A frame type tractor as defined in claim 13, further comprising frame reinforcing units for connecting upper portions of said backhoe mounting frame to portions of said main frame remote from said backhoe mounting frame.

19. A frame type tractor as defined in claim 18, wherein said main frame includes a pair of right and left elongate members, and a cross member interconnecting said elongate members, said frame reinforcing units being connected also to said cross member.

20. A frame type tractor comprising:

a main frame extending longitudinally of a tractor body;

an engine mounted in a front region of said main frame;

a transmission case mounted in a rear region of said main frame; and a backhoe mounting frame attached to a rear end of said main frame, wherein said main frame includes a pair of right and left elongate members, at least one cross member interconnecting said elongate members, and a first reinforcing cross unit and a second reinforcing cross unit interconnecting said elongate members forwardly and rearwardly of said transmission case, and each of said first reinforcing cross unit and said second reinforcing cross unit includes two substantially L-shaped split members respectively having vertical portions and horizontal portions, said horizontal portions being connectable to and disconnectable from each other, said vertical portions being connectable to and disconnectable from said transmission case.

21. A frame type tractor as defined in claim 20, wherein said first reinforcing cross unit and said second reinforcing cross unit are connected also to said transmission case.

22. A frame type tractor as defined in claim 20, wherein said first reinforcing cross unit and said second reinforcing cross unit are formed of cast material.

23. A frame type tractor as defined in claim 20, wherein said elongate members are elongate plates.

\* \* \* \* \*

UNITED STATES PATENT AND TRADEMARK OFFICE
CERTIFICATE OF CORRECTION

PATENT NO. : 6,729,431 B2
DATED : May 4, 2004
INVENTOR(S) : Osuga et al.

It is certified that error appears in the above-identified patent and that said Letters Patent is hereby corrected as shown below:

Column 1,
Line 34, "an engine is mounted" should read -- an engine mounted --

Column 5,
Line 66, "in four;" should read -- in four --

Column 12,
Line 15, "forword about" should read -- forward about --

Column 13,
Line 3, "disposed to at" should read -- disposed at --
Line 4, "driver's scat" should read -- driver's seat --

Signed and Sealed this

Seventh Day of December, 2004

JON W. DUDAS
*Director of the United States Patent and Trademark Office*